(12) United States Patent
Burger

(10) Patent No.: US 12,083,680 B2
(45) Date of Patent: Sep. 10, 2024

(54) EVENT SYSTEM

(71) Applicant: MACK RIDES GMBH & CO. KG, Waldkirch (DE)

(72) Inventor: Günter Burger, Waldkirch (DE)

(73) Assignee: MACK RIDES GMBH & CO. KG, Waldkirch (DE)

( * ) Notice: Subject to any disclaimer, the term of this patent is extended or adjusted under 35 U.S.C. 154(b) by 395 days.

(21) Appl. No.: 17/611,374

(22) PCT Filed: May 14, 2020

(86) PCT No.: PCT/EP2020/063557
§ 371 (c)(1),
(2) Date: Nov. 15, 2021

(87) PCT Pub. No.: WO2020/229640
PCT Pub. Date: Nov. 19, 2020

(65) Prior Publication Data
US 2022/0258348 A1 Aug. 18, 2022

(30) Foreign Application Priority Data
May 16, 2019 (DE) .................... 10 2019 113 013.1

(51) Int. Cl.
A63G 31/02 (2006.01)
A47F 10/06 (2006.01)
(Continued)

(52) U.S. Cl.
CPC ............ B25J 9/1664 (2013.01); A47F 10/06 (2013.01); A63G 31/02 (2013.01); B25J 11/0015 (2013.01); B25J 11/0045 (2013.01)

(58) Field of Classification Search
CPC ........ A63G 25/00; A63G 31/00; A63G 31/04; A63G 31/06; A63G 31/08; A63G 31/16;
(Continued)

(56) References Cited

U.S. PATENT DOCUMENTS 9,757,658 B1 * 9/2017 Kaufmann ............... A63G 7/00
2009/0101445 A1 4/2009 Mack
(Continued)

FOREIGN PATENT DOCUMENTS

DE 102015011538 A1 3/2017
EP 1833331 B1 9/2007
(Continued)

OTHER PUBLICATIONS

Office Action issued Dec. 22, 2022, in corresponding Singapore application No. 11202111516U.
(Continued)

*Primary Examiner* — Kien T Nguyen
(74) *Attorney, Agent, or Firm* — Nath, Goldberg & Meyer; Jerald L. Meyer; Stanley N. Protigal

(57) ABSTRACT

The invention relates to an event system (10, 50) for an animated event, wherein the event system (10, 50) comprises: at least one event furniture component (100, 200, 250, 300, 350) which can be moved in space and which comprises at least one table and/or at least one chair, and a device for sensory stimulation (12, 52) of guests (1) of the animated event, wherein the event furniture component (100, 200, 250, 300, 350) which can be moved in space comprises movement means for mechanical movement, and wherein the event system (10, 50) also comprises a first controller (1901) which is designed to control the mechanical movement and the output of the device (12, 52) for sensory stimulation of guests (1) of the animated event in a synchronized manner. The invention also relates to a method for operating such an event system (10, 50).

23 Claims, 12 Drawing Sheets

(51) Int. Cl.
*B25J 9/16* (2006.01)
*B25J 11/00* (2006.01)

(58) Field of Classification Search
CPC ........ A63F 9/043; A63F 9/052; A63F 9/0278; A63F 11/005
USPC .......................... 462/59–61; 472/59–61, 136
See application file for complete search history.

(56) References Cited

U.S. PATENT DOCUMENTS

| | | | |
|---|---|---|---|
| 2017/0225084 A1* | 8/2017 | Snyder | A63G 7/00 |
| 2018/0311588 A1 | 11/2018 | Beumers et al. | |
| 2019/0139368 A1 | 5/2019 | Kogler et al. | |
| 2019/0302776 A1* | 10/2019 | Ilardi | B62D 15/00 |

FOREIGN PATENT DOCUMENTS

| | | | |
|---|---|---|---|
| JP | 57-29774 A | 2/1982 | |
| JP | 61-131879 A | 6/1986 | |
| JP | S61131879 A | 6/1986 | |
| JP | 2015-16696 A | 1/2015 | |
| WO | 2007/068426 A1 | 6/2007 | |
| WO | 2018/002962 A1 | 1/2018 | |

OTHER PUBLICATIONS

Office action issued Oct. 3, 2023, in parallel pending Japan patent application No. 2021-568251.
Parallel Japanese office action issued Feb. 7, 2023, for JP 2021-568251, with English translation.
"5D experience" while eating? What is "elan vital", a restaurant that stimulates the five senses | RETRIP (website: https://rtrp.jp/articles/76978/) Feb. 5, 2017, with English translation.
A storm of surprises! Dream gourmet food in the world of fairy tales "Favetta of the Sun" | Lutron (website: https://letronc-m.com/4722) Mar. 5, 2019, with English translation.
Office Action dated Apr. 29, 2020, issued in corresponding German application 10 2019 113 013.1.

* cited by examiner

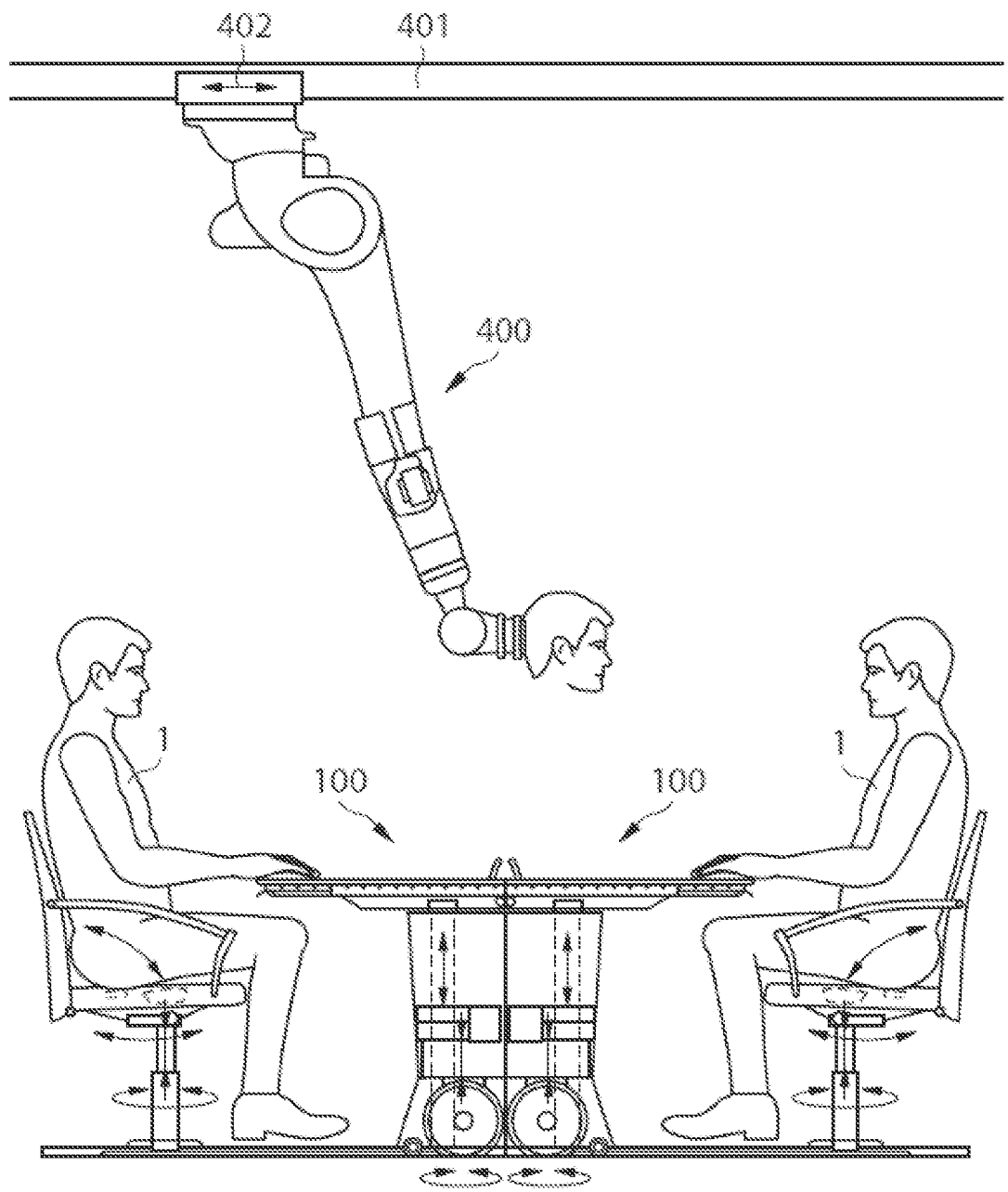

EVENT SYSTEM

This is a National Phase Application filed under 35 U.S.C. 371 as a national stage of PCT/EP2020/063557, filed May 14, 2020, an application claiming the benefit of German Application No. 10 2019 113 013.1 filed May 16, 2019, the content of each of which is hereby incorporated by reference in its entirety.

FIELD

The invention relates to an event system for an animated event, and to a method for operating such an event system.

BACKGROUND

Nowadays, participation in social life events is associated with ever greater expectations and a pursuit of experiences that go beyond the event itself. For example, a visit to a restaurant is increasingly no longer seen purely as an activity for the purpose of consuming food and, as the case may be, for the purpose of a social get-together; it should at the same time represent an entertaining experience. Accordingly, there are more and more offers in the field of experience catering that couple such an experience with food. In the most basic case, this can be done in the context of a themed restaurant, where the furnishings, the menu, but also the waiters' outfits are adapted to a specific theme.

In addition, very popular formats such as "crime dinners", Witzigmanns Palazzo and Schuhbeck's Teatro have developed, in which the meal is framed or embedded in a play or show event.

Another popular approach is for parts of the usual process in a restaurant to be carried out in an unusual, extraordinary way. One step in this direction is show cooking, in which the food is prepared right in front of the guests. Wait staff performing stunts is also known. Another variant belonging to this category is the well-known roller coaster restaurants, which are also described in EP 1 833 331 B1 and DE 10 2015 011 538. In these restaurants, the traditional serving process is replaced by transporting the ordered food and drinks to the tables under the eyes of the guests via a roller-coaster-like rail system, with the loading of said rail system by robots or robot arms being partly visible to the guests.

SUMMARY

The present invention is therefore based on the object of providing a novel event system which makes it possible, in particular, to supplement the sensory stimuli inherent in visiting an event, in particular a restaurant, café, or bar visit, in particular the sensory stimuli relating to taste in the case of a restaurant, café, or bar visit, in such a way that a more comprehensive sensory experience—which intensifies the overall experience of the event visit—can be provided for the guests of the animated event, which may also be a meeting or a cultural event.

This object is solved by an event system for an automated event and by a method for operating such an event system.

The event system according to the invention for an animated event comprises event furniture that includes at least one table which can be moved in space and/or at least one chair which can be moved in space and/or a device for sensory stimulation of guests of the animated event, which in the prior art is typically global lighting, i.e., lighting that is substantially the same for all guests of the event, with a lighting system and/or sound reinforcement with a sound system.

As a precaution, it should be remembered at this point that a table and chair are not necessarily required; one need only think of standing restaurants or chairs with integrated storage space for food and/or drinks.

It is essential to the invention that this event furniture part, which can be moved in space, has movement means for a mechanical movement, and that the event system also comprises a first controller which is designed to control the mechanical movement and the output of the device for sensory stimulation of guests of the animated event in a synchronized manner.

Specifically, this can mean, for example, in a very simple possible embodiment, that tables and chairs or groups formed from interconnected tables and chairs can be moved by remote control and, if a sound system plays a waltz, the individual tables together with the chairs assigned thereto and any guests of the animated event sitting at said tables or on said chairs circle around one another, whereas, if a march is played by the sound system, the individual tables together with the chairs assigned thereto and any guests sitting at said tables or on said chairs move behind one another in a line through the event location, e.g. a restaurant.

Another aspect relates to an event system for an animated event, which, in addition to the already described event system comprising event furniture, has at least one table which can be moved in space and/or at least one chair which can be moved in space and/or has a device for sensory stimulation of guests of the animated event in addition or alternatively to at least one movable floor section which can be moved mechanically by at least one movement apparatus. It is essential to the invention here that this at least one floor section which can be moved in space has at least one movement apparatus for a mechanical movement, and that the event system also comprises a first controller which is designed to control the mechanical movement and the output of the device for sensory stimulation of guests of the animated event in a synchronized manner.

Movement means or a movement apparatus for a mechanical movement within the meaning of this disclosure are already present if interaction with another, outside the corresponding event furniture component is possible in order to execute a movement.

In particular, while mechanical movement requires that it be driven, it may be sufficient, for example, to provide only a coupling element for coupling to a drive system provided outside the event furniture component or floor section, for example a magnetic coupling to a magnetic transport system or a mechanical coupling to a conveyor chain; the drive system does not necessarily have to be fully integrated into the event furniture component in order to have the claimed movement means.

A coupling to an externally provided controller may also suffice, in particular to the controller that ensures the synchronization of the movement. A coupling of this kind can be realized, for example, by means of control signals transmitted wirelessly to a drive system integrated into the event furniture component or the floor section such that local control is possible and useful for a number of applications, but not necessary.

The controller can be part of an overall sequence control system or can in turn be controlled by such.

It should be noted in particular that the presence of means for carrying out a machine-controlled movement does not preclude additional means for carrying out a movement controlled by guests themselves, it also being possible for parts of these means to be used for both purposes. In fact, according to a preferred development of the invention in particular, the event furniture component additionally has operating elements for influencing the movement by means of the guest, for example pedals, drive rockers, hand levers which act like vertical rudders, or the like.

The movement apparatus can move the at least one floor section in at least one degree of freedom, preferably three or more degrees of freedom. In this very simple case, the at least one floor section can execute a lifting movement and thereby realize acceleration effects such as those that occur in an elevator. The elevator journey could be enhanced by further effects, such as a possible failure of the elevator, an earthquake or other effects which, in addition to a pure lifting movement, also have superimposed movements in transverse directions and/or in the solid angles. In the case of a complex movement apparatus, so-called hexapods, such as is used, for example, in flight simulators for pilot training, swivel, roll, and tilt movements can also be realized, i.e., movements in up to 6 degrees of freedom. This can then be used to integrate further action or narrative moments into the event. For example, King Kong can appear on a skyscraper, on the outer facade of which the elevator is traveling, and can jolt the elevator, causing it to sway. In particular, if the view simulated on the viewing platform by sensory stimulation is that of a mountain peak, it is also possible to simulate the flight movements of a giant bird or dragon carrying the guests in the sensory stimulation up the mountain, which further intensifies the overall impression.

The floor section can also extend over the entire room and can further accommodate all event furniture in the room, or the event furniture may be arranged on said floor section or floor. For example, a flying carpet of a fairy tale can be simulated, with the floor section of the entire room being moved up and down by the movement apparatus synchronously with the device for sensory stimulation of guests and can occasionally vibrate. A deflection in the three solid angles can produce additional stimuli for the guests, it being possible for the device for sensory stimulation to also simulate supplementary relative movements which can be intensified or likewise produced by the movable event furniture.

The movement apparatus can comprise at least one linear drive system. Conventional movement apparatuses, known for example from simulator technology, in particular hexapods, can be used unproblematically for small floor sections, but scaling to larger spaces and larger weights can bring considerable challenges when it comes to meeting particular safety aspects of the event system. In the simplest case, for example, the movement apparatus can comprise a linear drive system, such as for example a hydraulic cylinder, which can move the floor section either in the horizontal and/or in the vertical.

In order to facilitate scaling, the movement apparatus can have a weight compensation system, which relieves the pressure on the movement apparatus at least to the extent that the floor section can be held without force in a preferably arbitrary position in the idle state of the event system, i.e., without passengers and/or event furniture. For this purpose, either counterweights can be provided, as well as nitrogen storage units, dampers, or springs, by means of which pressure can be preferably permanently relieved and/or by means of which, depending on the desired inertia, the necessary energy is provided in each case in order to execute a corresponding movement of the at least one floor section.

The movement apparatus can comprise a motion link, by means of which a deflection of the at least one floor section is predetermined. The motion link can be displaced, for example, by the at least one linear drive system and can be displaced relative to the at least one floor section. The at least one floor portion can, in turn, be supported on the motion link, with the motion link predetermining the deflection of the at least one floor section at the support. The at least one floor section can be supported, for example, on three supports—in each case on a motion link. The motion links can be operated synchronously or asynchronously. In the case of a synchronous displacement of the motion links, a lifting movement of the at least one floor section can be implemented and, in the case of asynchronous displacement, superimposed movements in all six degrees of freedom. In addition to a ramp, the motion links can have a corrugation by means of which a shaking effect or vibrations can be produced. A curve binding the motion link can thus have a plurality of local maxima and minima.

The device for sensory stimulation can be configured and/or designed in particular for visual, acoustic, olfactory, and/or haptic stimulation or, in other words, be a device for visual, acoustic, olfactory, and/or haptic stimulation. It is particularly preferred if, in addition to the sense of taste that is stimulated anyway by food and drinks in a restaurant, café, or bar, all other senses are likewise stimulated—ideally so as to be adapted to a topic and/or to the progression of a story.

It is particularly preferred if the environment and/or the sensory stimulation are or is variable and preferably adaptable to guest-specific content.

Advantageously, it can be not only globally configured such that all event visitors are presented with the same content, but also contain local components that are only reproduced at a given table.

Firstly, visual stimulation is possible, which in the simplest case can be achieved by providing content on a screen. Another type of visual stimulation is projection onto a surface, for example a table surface or a projection surface of the animated event. With the means of modern projection technology, it is also possible to create virtual objects on such a surface that can appear deceptively real. In this way, for example, if embedding the event visit in an "Expedition in Africa" theme, a stream of giant ants can appear to run across the table. A projection of this kind can also obscure, for example, that an object has actually disappeared from the table by replacing it with its projection. Other types of visual effects can be achieved by adapting the lighting, using false smoke, producing confetti, and similar arrangements.

Secondly, acoustic stimulation is possible. In addition to the pure reproduction of content via a locally arranged loudspeaker, acoustic stimulation can also be realized with a significantly more complex sound system that produces specific sound effects based on input from a higher-level controller or based on input from read-out sensors. For example, the seating position of the chair on which the guest is sitting could be monitored and a creaking sound played with every movement or a drinking process could be identified with camera monitoring and then accompanied by loud drinking noises.

Another highly interesting alternative, when embedding the event in a narrative framework, is to locally output different information via the relevant loudspeaker, for example allowing conversations to be listened to in some positions in the room, but not in others. In this way, "crime dinners" for example can be made even more interesting and guests can be encouraged to visit the same event several times in order to relive the story from a different perspective.

Thirdly, olfactory stimulation is possible by delivering locally targeted aromatic substances. For example, a smell of fire can significantly intensify the experience of a fire in the adventure story with which the event visit is animated, or, if the story is taking place at sea, an attempt can be made to recreate the smell of saltiness associated with the sea. If the animation also involves personnel and/or actors, their appearance can also be accompanied by smells, for example by giving off an intense smell of rum when the pirate captain walks past the table.

Fourthly, haptic stimulation can also take place, for which there are a large number of possibilities for implementation. The possibility of an event being accompanied by vibrations and/or movements of the at least one floor section has already been addressed above. However, blowing hot air through a fan from the direction of a fire shown in the animation or from the mouth of an animal that appears to be passing by, for example a projected animal, can also provide very impressive effects. Liquids can also be used successfully here, for example by means of spraying devices.

According to the invention, at least one such device for sensory stimulation is operated synchronously with the machine-controlled movement in order to produce a coherent overall experience. This is possible in particular if a local controller of devices at the table and/or a controller for moving the table (which can also be the same local controller at the table as the controller of devices) interacts with a higher-level control and/or navigation system.

If, in a further development of the invention, the event system also has at least one further movable event furniture component in the form of a wall, partition, or privacy element, said component cannot only serve to make the spatial experiences that are experienced during the event visit more variable, but also form a basis for further effects, e.g., a projection screen for visual stimulation. In this case, it is particularly preferred if the movable wall, partition, or privacy element can also be moved mechanically and this mechanical movement is controlled either by the first controller and/or by a further controller. This also allows mutual support of effects, for example the impression of a quick movement for a guest sitting on the chair of an event furniture component can be supported not only if said event furniture component moves, but also at the same time if a wall, partition, or privacy element moves in the opposite direction.

The visit to the animated event can be made even more interesting for the guests if the event system also has means for the automated provision of food on the table, which means are controlled by the first controller and/or by a further controller.

In particular, these means can be provided by a further mechanically movable event furniture component in the form of a buffet device. In this context, a buffet device is to be understood, in particular, to be devices on which prepared food is provided for consumption; it can therefore also be a sushi belt, for example. This event furniture component can then drive up to the event furniture component occupied by the guests and dock for a long time or allow the guests of the event to choose and take food in a synchronous movement.

A second possibility is to provide openings in the floor surfaces, wall surfaces, and/or ceiling surfaces of the event system, through which openings food and/or drinks are supplied by appropriate means of transport to the guests or to the event furniture part at or on which the guests are located, and/or dishes are removed once a course of a meal has ended. For example, a gripper can suddenly travel from the ceiling and remove empty plates, or, by means of a lifting mechanism, an ordered dish can be conveyed up through a flap in the floor and a recess in the table positioned thereabove, which recess is opened such that the dish suddenly appears on the table. These processes are also preferably synchronized with the output of the device for sensory stimulation. For example, a projected band of monkeys dragging fruit along could seemingly rampage across the table, and, after the projection has ended, the guest of the animated event suddenly finds a plate of fruit in front of them, which was carried into place by such a transport mechanism via a hidden shaft.

A third possibility consists in operation by a robot or robot arm if the first controller and/or the further controller are or is programmed and designed in such a way that the means for the automated provision of food on the table interact with the robot during the automated provision of food.

For this reason in particular, it can be advantageous if the event system has at least one robot or robot arm which is controlled by the first controller and/or by a further controller.

This robot is preferably suspended from the ceiling or mounted on a guide system mounted on the ceiling in order to reduce the complexity of the coordination of the many movements to be brought together in collision-free harmony on the floor of the event location, in particular of a restaurant.

In another development of such an event system with a robot or robot arm, the first controller controls the mechanical movement of the chair, of part of the table, or of the table by interacting with the robot or robot arm controlled by the first controller.

To this end, at least one component of the event furniture with means for carrying out an individual machine-controlled movement should preferably have an interface for interacting with a robot arm or robot. In specific terms, this can, for example, look like the robot or a robot arm engaging a protected section in a form-fitting and frictional fit and thus either steering the drive system for movement or directing it with navigation forces. Of course, the robot or robot arm can also provide the control pulses, for example by operating a joystick or non-contact signal transmission, for example by means of near field communication. The latter in particular can give the impression that the movement is carried out as if by magic.

A further possible use for such a robot is that the first controller and/or the further controller is programmed and designed in such a way that the robot interacts with guests of the animated event. This can consist in a "classic" taking of an order, but may also contain additional, unusual elements. For example, the robot can detect specific features of the guest or agree a code word with said guest and then later, when the food is being served, release the food for the guest only after verification of these features, or prevent the guest from consuming the food if the verification fails or if another guest at the same table tries to access it.

The mechanical movement can be effected in particular by using an air cushion system, a magnetic system, by means of an in-floor conveyor system, by means of a rail system, or by means of a combination of these systems—in particular in sections. If an active drive system is provided on an event furniture component of the event system, this can be implemented by friction wheel or Mecanum wheel arrangements; in particular, two friction or Mecanum wheels that are coordinated with one another in terms of software and, preferably, height-adjustable can be used.

The controller is preferably programmed and designed in such a way that the device for sensory stimulation of guests of the animated event provides visual content, in particular visual content either projected onto tables, chairs, floor sections, wall sections, or in the space between the components of the event system, or provides said content to the user in a personalized viewing device, and/or acoustically accompanies mechanical movements and/or projected visual content, and/or releases aromatic substances that are preferably adapted to visual content or acoustic accompaniment, and/or generates haptic stimuli, preferably locally at tables or chairs.

In another preferred embodiment of the invention, the event system has one or more sensors for detecting the behavior of guests of the animated event, which sensors are in signal communication with at least one of the controllers. A large number of effects, but also safety-relevant functions, can be implemented in this way.

In order to reliably monitor and combine the complex occurrences during the event, it is advantageous if the event system, preferably the first controller, has a navigation system by means of which the position of individual components of the event system can be detected and the movement of individual components of the event system can be controlled.

Precisely because of the complexity of the processes, it is preferred if the event system also has means for displaying a countdown for service personnel and, if necessary, also for the guests.

For safety reasons, and to ensure orderly operating processes, it is advantageous for operating devices which are in signal communication with the first controller and allow intervention in the procedures of the first controller to be available to event employees. Technically, this can be realized by a wireless connection as well as by a connection "by wire", i.e., a wired connection. Advantageously, these operating devices have confirmation and/or manipulation keys which can be used to start, stop, or interrupt program sequences, or change them in a predefined way such that only a single key press or a few key presses are sufficient to control and/or influence even complex processes.

In this way, visual control can be provided in addition to technical safety functions. If the relevant employee sees, for example, that an event guest is endangering himself/herself or others, a gentle stop or emergency stop can be brought about with a key press. If, for example, the employee notices in the above-mentioned example of a projection of giant ants that a guest is panicking due to a phobia of ants, the projection can accordingly be deactivated at this specific table. In this way, a smooth and harmonious progression of the animated event can be ensured.

Another technical possibility for providing the above-described functionalities is a voice control system, by means of which—possibly by using special speech codes in order to avoid random triggering—security functions and/or show commands can be triggered or activated. Such a voice control system can also be used in interactive formats to allow guests to participate.

In another advantageous further development of the event system, means for interacting with the first controller and/or a further controller are provided locally on event furniture components, in particular on tables and/or chairs, thus forming a user interface, for example to allow an event guest to influence the mechanical movement and/or to carry out ordering processes. It is particularly preferred to provide a user interface with a display for displaying information. Such a user interface can then be designed, for example, as a touch panel or also as a special tablet PC that is integrated into the event furniture component in question.

Apart from the possibility of viewing the food and drink offering and placing orders, information can also be presented here as a basis for decision-making for the further progression of the event visit and preferences of the guest for the further progression of the event visit can be queried.

For example, if the meal is embedded in an animated adventure story, a plurality of continuation possibilities could be put to the vote such that, depending on the outcome of the respective votes, in the case of a repeated visit to the event different stories are experienced each time even if the themed adventure story is the same. However, it could also be possible, for example in the context of a dating event, to enter preferences for the participant whom one would like to get to know as the event progresses, possibly supported by brief information on this information, which can be called up via the display.

The method according to the invention for operating an event system according to the invention is characterized in that a mechanical movement of at least one restaurant furniture part and/or of the at least one floor section and the output of the device for sensory stimulation of guests of the animated event are automatically synchronized with one another by the first controller.

It is particularly preferred in this method if the food is provided on the table in an automated manner. This can not only help to reduce personnel costs, but also opens up a variety of special effects to make the event visit even more entertaining.

The first controller and/or another controller can also control at least one robot or robot arm. This can be used in particular for the robot to participate in the automated provision of food on the table or for the robot to interact with event visitors.

Such interaction can be made particularly interesting if the robot or robot arm is equipped for interaction with a bust onto which faces can be projected. These can be, for example, the faces of famous personalities, but also other images, e.g., from photos or videos that were taken in advance by relatives or friends. Preferably, the voice of the robot or robot arm is also adapted accordingly. In such a case, for example, the robot arm can approach the guest, and the guest is asked by a face that looks like that of the guest's mother, and in her voice, what the guest wants to eat or where they have been hanging out.

Advantageous operating modes of the device allow the device for sensory stimulation of guests of the animated event to provide visual content, in particular visual content either projected onto tables, chairs, floor sections, wall sections, or in the space between the components of the event system, or provide said content to the user in a personalized viewing device, and/or acoustically accompany mechanical movements and/or projected visual content, and/or release aromatic substances that are preferably adapted to visual content or acoustic accompaniment, and/or generate haptic stimuli, preferably locally at tables or chairs.

BRIEF DESCRIPTION OF THE DRAWINGS

The invention is explained in more detail below on the basis of figures which represent embodiments. In the drawings:

FIG. 4: shows an example of an interaction with a robot arm;

FIG. 12c: shows a further development of the event system according to FIG. 12a;

DETAILED DESCRIPTION

Figure 1:
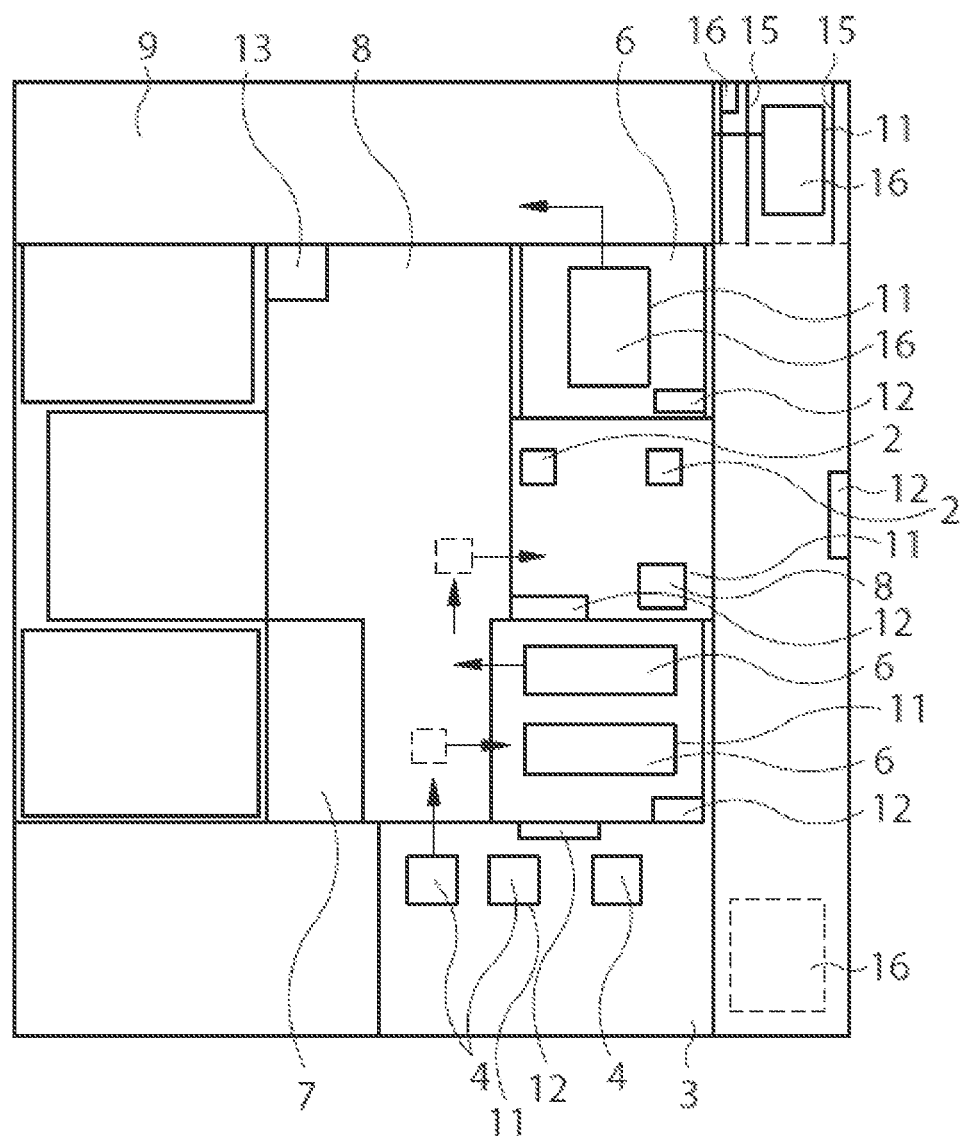
FIG. 1: shows a plan of an example of an event system, viewed from above.

Identical objects are provided with the same reference numerals in all figures, unless otherwise mentioned. In order to increase the clarity of the figures, however, not all reference symbols are always entered in each figure.

FIG. 1 illustrates an example of an event system 10 for an animated event held in a restaurant with a bar area 9, experience area 2, appetizer area 3, two areas for main courses 4,5, a dessert area 6 as well as a sanitary area 7 and kitchen area 8 and can be operated, for example, with the theme "space travel".

The event system 10 has a number of distinctive features.

A first distinctive feature is that, in particular, the tables 11 together with associated chairs, which are symbolized as a rectangle in FIG. 1 and whose current number of places is entered in the rectangle, are formed by groups of event furniture components with movement means for a mechanical movement in space, each having a chair and a table by way of example, as will now be explained in more detail with reference to FIG. 2.

Figure 2:
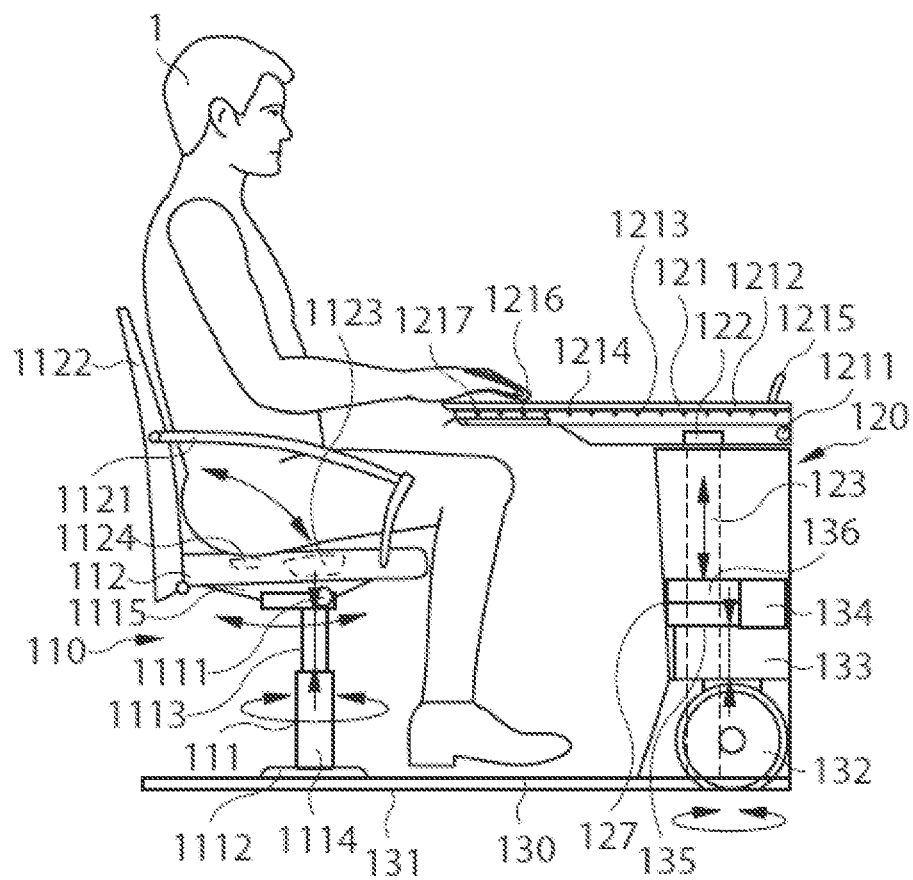
FIG. 2: shows an example of an event furniture component which can be moved in space in the form of a table-chair combination.

FIG. 2 shows an example of an event furniture component 100 which can be moved mechanically in space and which in this case is designed as a chair 110 that is arranged together with a table 120 on a base plate 130. The position of the chair 110 relative to the table 120 can be changed by means of a supporting frame 111, to which a seat 112 with armrests 1121 and a movable backrest 1122 is connected via a quick coupling 1111 so that the seat 112 can be easily and quickly replaced using the attachment parts arranged thereon, for example when the theme of the event system is changed or when the target group is changed, for example when a children's birthday party has taken place in the afternoon and a speed dating event is to take place in the evening.

The supporting frame 111 has a sliding mechanism 1112 for sliding the chair 110 toward the table 120 and away from the table 120, a lifting mechanism 1113 for changing the seat height relative to the base plate 130, a rotation mechanism 1114 for rotating about an axis perpendicular to the base plate 130 and a tilting mechanism 1115 which preferably realizes a tilting movement along a motion link in order to move the center of rotation to the position of the average body's center of gravity. Optionally, these mechanisms can also be driven, for example by electric motors, and can be controlled by means of a controller via wireless communication means.

In this embodiment, an apparatus for sensory simulation 1123 of a guest 1 of the animated event, which here by way of an example is a vibration element, is also accommodated in the seat 112 itself. This apparatus for sensory stimulation 1123 is controlled by a first controller, for example via a wireless connection. The control is in particular synchronized with a mechanical movement of the event furniture component 100. This can be used in a variety of ways—for example, to accompany the mechanical movement, for example to give the impression of a bumpy slope during a driving movement, but also as a signal that a movement will soon take place for which the guest 1 should prepare.

In addition, a sensor 1124 for detecting the seat occupancy is also integrated in the seat 112, the data from which sensor can also be used by the controller, for example as part of a safety check before the mechanical movement is initiated, or in order to save effects in an empty space. An operating element 1125, which can also be designed as a sensor and the state of which is read out by the controller is arranged on the armrest 1122; said operating element can be used, for example, to acknowledge a movement or to signal that the guest 1 is now ready for an imminent movement.

Preferably, the armrests 1122 can also be moved in height and fully lowered, which allows content-specific requirements to be met and surprise effects to be evoked. To this end, a central guide with drive system can be integrated in the backrest.

The table 120 has a tabletop 121, which is connected via a quick coupling 122 to a preferably height-adjustable stand 123, which is fastened on the base plate 130. In this embodiment, the tabletop 121 has a large number of components which, however, can also be used individually or in groups and are largely independent of one another.

For example, at the edges of the tabletop 121, transmitters and/or receivers 1211 can be arranged which enable the position and location of the event furniture component 100 in space to be determined and are preferably integrated into a navigation system, which in particular locates the positions of all event furniture components.

If such a navigation system is present, this locating process can also be supported by the signals from contact loops that run in the ground.

The edges of the tabletop 121 can also have distance sensors 1212, by means of which the coupling processes between different event furniture components 100 are monitored and/or have safety sensors 1213, for example in the form of pressure sensors or optical sensors, which reliably prevent a part of a guest's body that is currently in the edge area of a tabletop 121 from getting caught during a mechanical movement or indicate that the guest is ready for the next action.

Moreover, means for generating special effects 1214, i.e., further devices for sensory stimulation, can be arranged indirectly or directly on the tabletop 121, e.g., LEDs, nozzles for releasing mist, moisture, vibration elements, or the like.

For example, a virtual protective jacket with different safety zones can be placed around event furniture components in order to safely and efficiently regulate the traffic and coupling processes, it being possible for e.g., speeds and driving forces to then be reduced as a precaution if another event furniture component or other object is located in the safety zone. However, as an additional effect in the critical and final coupling process, for example, red colored or red illuminated mist could be emitted and/or a sound effect could be output or an area could be vibrated when touched. The corresponding zones should be freely programmable.

Displays 1215, 1216, which are preferably connected to or integrated into the tabletop 121, can also be arranged on the tabletop 121. These also represent further devices for sensory stimulation; they can inform or entertain the guest 1. If the displays 1215, 1216 are designed as a touch display, they can also serve as an input means and operating element for the guest 1, but separate operating elements 1217, such as a pull-out control panel, can also be provided for this purpose.

On such a display 1215,1216, at the assigned space, it may be possible in particular to retrieve personalized content that the guest voluntarily disclosed during registration. This can also be done in a synchronized manner.

Furthermore, a kind of Jude Box could be integrated in the area of the displays on or on the table, where certain variants which match the content, e.g., in the form of film, image, sound or light content, are stored and between which a selection can be made—optionally according to a majority decision of all guests.

Interactive game options can also be offered, in particular with relevance to the content in question, by means of which options the guest can then, for example, earn a reward. For example, the guest could be given the task of identifying and acknowledging certain hidden features in the content during the event, receive points in a bonus account, and then receive additional services in exchange for said points during the course of the event, e.g., an additional course or a special drink.

A housing 127 is arranged around the stand 123 and forms a protected technical room for components housed in its interior that are necessary for the operation of the event furniture part and, in particular, some of the components necessary for the mechanical movement.

The movement means for a mechanical movement can be categorized as follows.

Such means for a mechanical movement of an object and in particular a mechanically movable event furniture component can generally be categorized as follows.

Firstly, there are support means which bring the object to be moved into a position in which it can be moved without significant friction, or hold it in said position. Examples of such support means are wheels or (ball) casters, and air cushions, but they can also be realized by suitable magnetic systems. Obviously, this type of movement means is absolutely necessary for mechanical movement.

Secondly, there are drive means which produce the actual movement of the object to be moved. Depending on the design, these can also fulfill a function as support means or coincide therewith, as is the case, for example, with driven wheels, in particular friction or Mecanum wheels, or wheel axles. However, such drive means do not necessarily have to be arranged completely on the object to be moved, but at least one partial component to which a part of the drive means that is not arranged on the object to be moved is then coupled, for example in a magnetic system by means of a magnetic interaction or by means of a mechanical intervention, e.g., in a system with conveyor chains.

Thirdly, there are control means which specify to the drive means the movement to be executed. These can be present locally on the object to be moved or not on the object to be moved. In the first case, they can be designed in such a way that they act semi-autonomously, for example in the case of hall transport systems or in concepts for autonomous driving in vehicles. In the second case, the drive means receive the control commands from an external controller. Mixed cases are also possible, in which a subordinate controller is present locally on the object to be moved, but also receives and executes control commands from a higher-level controller not arranged on the object to be moved.

Fourthly, in all cases for implementing the synchronization according to the invention, generally at least one communication module is present on the object to be moved, by means of which control commands and data can be exchanged with another controller.

Fifthly, operating materials storage units and/or operating materials generators can also form a substantial component of the means for mechanical movement, for example, in a system with air cushions, a compressed air reservoir as an operating materials storage unit, and a compressor as an operating materials generator, or, for example, a storage capacitor (CAP), a super capacitor super CAP, a battery, or a rechargeable battery as an operating materials storage unit for the needs of a local, electrically driven drive means, a local controller, and/or the communication module or means for inductive current transmission as operating materials generation.

In the exemplary embodiment of a mechanically movable event furniture component 100 shown in FIG. 2, the support means 131 are provided on the bottom of the base plate 130 and can be designed, for example, as air cushion pads, magnets, ball casters, or the like.

In the case of the exemplary embodiment of a mechanically movable event furniture part shown in FIG. 2, the drive means is at least one electrically driven friction wheel 132, preferably a pair of electrically driven friction wheels 132, arranged so as to be rotatable about a preferably vertical axis, this rotational movement also being driven. This rotation is preferably realized at the quadrant point of the friction wheel 132. Independently of this, it is preferred if the rotation is realized with the highest possible resolution of angular increments.

In addition, there is a driven height adjustment mechanism 133 for the electrically driven friction wheel 132 or the pair of electrically driven friction wheels in order to enable a fine adjustment of the load distribution and the contact pressure. It is self-evident that the base plate 130 has an opening through which the friction wheels 132 are in contact with the floor. Of course, such an arrangement can be realized in the same way with Mecanum wheels.

The friction wheels 132, including their electric drive system and the height adjustment mechanism 133, are, together with an operating materials storage unit 134, specifically here a battery for the power supply of the electrical components and, in the case of the use of an air cushion, a compressed air storage unit as well as local control means 135 and a communication module 136, which preferably operates wirelessly and establishes the signal communication with the controller 13, housed in the housing 127.

Figure 13:
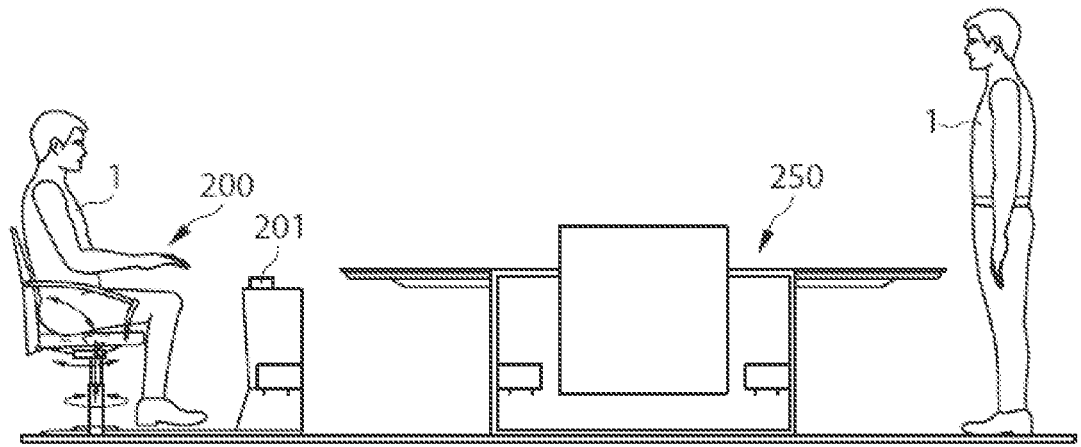
FIG. 13: shows a first variant of the event furniture component from FIG. 2.
Figure 14:
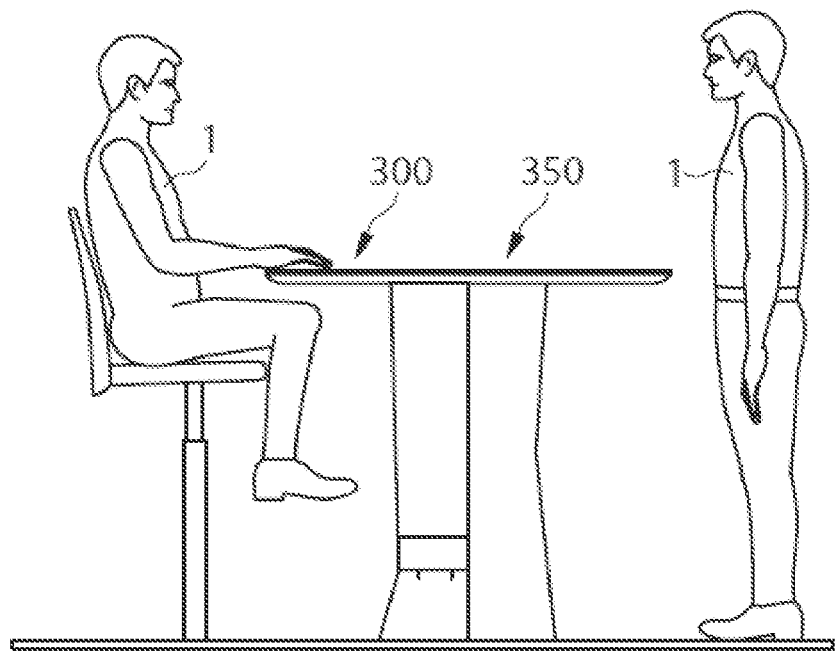
FIG. 14: shows a second variant of the event furniture component from FIG. 2.

As FIGS. 13 and 14 illustrate, however, other event furniture components 200, 250, 300, 350 with means for mechanical movement that do not have both a seating option and a table component are also conceivable. Specifically, a variant with an event furniture component 200 is shown in FIG. 13 which differs from the event furniture component 100 in that it does not have a tabletop and accordingly the components arranged on the tabletop 121 of the event furniture component 100 are also omitted. For this purpose, the table—which can optionally also be an attachment part of a buffet device—is designed as a separate event furniture component 250 with means for mechanical movement—identical to the embodiment in FIG. 2—to which the separate chair, which forms the event furniture component 200, can be coupled by means of an optional coupling device 201.

The variant shown in FIG. 14 is particularly suitable for cases in which a bar-like atmosphere is desired, for example when an event such as speed dating is the theme of the animated event. The event furniture component 300 is fundamentally identical to the event furniture component 100 and differs therefrom primarily with regard to the table height and the height of the chair. The event furniture component 350 has no seating option at all, only a (standing) table; the guest stands here on a base plate 350 while moving. However, the means for mechanical movement and the sensor system can each be implemented for both the event furniture component 300 and the event furniture component 350 in the same manner as described above for the event furniture component 100.

As a consequence of the fact that the event furniture components 100, 200, 250, 300, 350 are equipped with movement means for a mechanical movement in space, a first controller can control a movement, in particular of these event furniture components, in space. For example, a number of tables may be driven through the restaurant together and then split apart into other groups of tables with associated chairs 11 or reconfigure themselves.

A second distinctive feature of the event system 10 is that it has—shown here merely schematically—devices 12 for sensory stimulation of guests of the animated event, which are here distributed to the different areas. In particular, this is realized here as a visual stimulation by means of projectors and supporting these visual effects with sound effects, as is evident in the following, but olfactory effects can also be achieved by releasing aromatic substances or haptic effects, e.g., vibrations, spray mist, air currents, or the like. The output of the sensory stimulation can be easily adjusted depending on the desired theme by using appropriate programming, and even an individualization of the content may be possible.

The third distinctive feature of the event system 10 is that movement of the event furniture components and sensory stimulation of the guests 1 arranged thereon are synchronized with one another by a component of a controller 13, which is also shown only schematically in FIG. 1, but is now explained in more detail with reference to FIG. 11.

In the embodiment figure of FIG. 12, the controller 13 is constructed in such a way that the first controller 1901, which is designed according to the invention to control the mechanical movement and the output of the device for sensory stimulation of guests of the animated event in a synchronized manner, is formed by a master controller or main controller. This first controller 1901 is in signal communication with a number of subordinate controllers from which it receives data and to which it gives control commands, in particular:

a chair controller 1902, which controls the degrees of freedom of movement and special effects, such as the vibration of the chair 110 of the event furniture component 100, and which transfers sensor data from sensors arranged on the chair 110 to the first controller 1901;

a table controller 1903, which controls the degrees of freedom of movement and special effects of the table 120 of the event furniture component 100 and which transfers sensor data from sensors arranged on the table 120 to the first controller 1901;

a light controller 1904, which controls the lighting and lighting effects in the different areas of the animated event;

a fan controller 1905, which controls the locally and globally provided fans for circulating air and for producing haptic effects by means of the air flow;

a buffet controller 1906, which moves, in particular, event furniture components in the form of mechanically movable buffets, in space and which transmits their coordinates to the first controller 1901 for navigation;

a robot controller 1907, which moves, in particular, event furniture components in the form of mechanically movable robots, in space, which controls the interaction of said robots with guests and the environment, and which transmits their coordinates to the first controller 1901 for navigation;

a sound controller 1908, which generates and coordinates the sound effects when the animated event is in operation;

a projection controller 1909, which generates and coordinates the visual effect, in particular the projections, when the animated event is in operation;

a navigation controller 1910, which controls and monitors in particular the movement of the mechanically movable event furniture components 100;

a calibration controller 1911;

an operator controller 1912, by means of which event employees can actively intervene in the progression of the animated event via an operator unit and which also gives event employees information as to when specific operating materials are running low;

a docking station controller 1913, which controls the charging of the event furniture components 100 with electricity, compressed air, and/or other consumable materials by means of a docking station; and a floor movement controller 1914 which can control the degrees of freedom of movement and the special effects, such as the vibration and movements of a floor section 63 or of a floor on which the event furniture can be arranged in space, and which can transfer sensor data from sensors arranged on the floor section 63 to the first controller 1901.

In order to make the operating principle of the event system 10 more understandable, an exemplary operation with the theme of "space travel" will now be described.

The guests first enter the bar area 1, which can be designed like a hangar of a spaceport, for example, and wait there with an aperitif until everyone has arrived and decided on a particular menu and the event furniture is ready for use.

Subsequently, a door opens to the experience area 2, and it can be suggested to the guests by projection in the bar area 1, for example by means of the device for sensory stimulation 12, that the door through which they are entering is the door of a spaceship.

In the section of the experience area 2 the guests have now entered, they will first find a table 11 with 12 places, which—and this does not necessarily have to be evident at first, but can even be concealed to achieve surprise effects, in particular by means of the device for sensory stimulation 12 using a suitable projection—actually consists of 12 individual event furniture components, e.g. the chair-table assemblies 100 which have been described above in detail in the context of FIG. 2 and can each be individually mechanically moved.

It should be noted that this area in particular is also well suited for providing docking stations 16 at which the event furniture components are supplied with operating materials such as electricity in the form of charging a rechargeable battery, compressed air, operating materials for special effects, and the like; firstly, because it can be ensured at the beginning of the event that the operating materials necessary during the course of the event are available and, secondly, because at this point the event furniture components usually remain in one place for quite a while.

After all the guests have sat down and an acknowledgment signal has been given, a countdown 14 begins to run down, which ends with a rocket launch simulated by the device for sensory stimulation 12 in the experience area 2.

During the rocket launch, the device for sensory stimulation 12 in the experience area 2 of the table 11 with 12 places is set in motion to a corresponding acoustic accompaniment, for which purpose the twelve individual event furniture components are moved jointly and synchronously through the experience area 2 by means of the controller 13. In synchronization with this movement, the controller 13 causes the device for sensory stimulation 12 in the experience area 2 to project moving images onto the walls of the experience area 2 in order to create the impression of the rocket movement. In addition, a background soundtrack can be provided by sound effects.

A particularly convincing perception can be created when mechanically moving wall, partition or privacy elements 15 with windows are moved by the controller synchronously with the table 11 with 12 places so that the moving projection on the walls of the experience area 2 is followed through the windows, thus further enhancing the impression of being stationary in a spaceship.

Furthermore, further effects can be produced by the same or another device for sensory stimulation 12 in order to enhance the experience of space travel. For example, vibration means arranged in the chairs of the event components can be vibrated by the controller during the start sequence.

Figure 3:
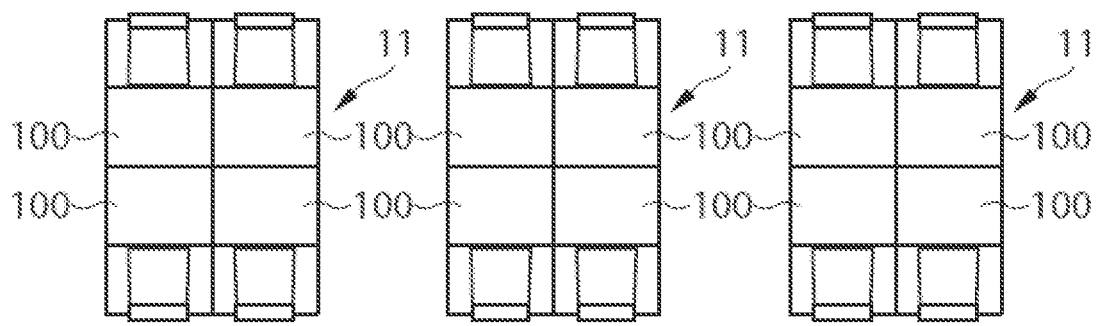
FIG. 3: shows a schematic example of a table formation that can be realized with the event furniture components that can be moved in space from FIG. 2.

At the end of the factitious "space flight", arrival at a space station can be projected, for example. A mechanically moving wall, partition, or privacy element 15 is lowered into the floor and the appetizer area 3, which is designed as a different hangar, opens up to the view of the guests. To the astonishment of said guests, the table 11 for 12 persons, at which they have until now sat together, now begins to divide, and the individual event furniture components 100 independently perform mechanical movements under the control of the controller 13, which in the end cause said components to become, for example, four tables 11 for four persons, which have configured themselves by means of mechanical movement at predetermined points in space, each from four event furniture components 100 as shown in FIG. 2, i.e., a configuration as sketched by way of example in FIG. 3. Of course, other groupings are also possible.

The manner in which this configuration is created can be determined in different ways. For example, it can be based on an order previously placed, for example in the bar area 1, so that the persons who want to eat the same appetizer end up at the same table for multiple people or the number of different appetizers present at each table is maximized.

A variant that is very appealing from an experience point of view can consist in the grouping of the event furniture components being preceded by an interaction with another mechanically movable event furniture component in the form of a robot or robot arm 400, as is now described in more detail with reference to FIG. 4.

FIG. 4 shows two examples of mechanically movable event furniture components 100, as described above in the context of FIG. 2, in an interconnected state and with a guest 1 arranged thereon. Furthermore, another event furniture component can be seen in the form of a robot or robot arm 400 suspended from a guide rail 401 with the aid of its driven automated drive unit as a movement means 402 for executing a mechanical movement.

In principle, such a robot or robot arm 400 can also travel on the floor, but the embodiment in which it is suspended from the guide rail 401, which belongs to a rail system, has the advantage that the already complex control of the mechanically movable event furniture components 100 is not further simplified by additional event furniture components moving on the floor, which do not necessarily have to be present there.

The robot or robot arm arrives in response to a command from the first controller 901 and begins interaction with the guests 1. In particular, a voice interface, as is known from computer assistance systems such as Siri or Alexa, can be used in order to analyze the results of the interaction and, if necessary, to translate them into actions—for example during an ordering process.

This can proceed, for example, as a kind of access control for entering the space station, carried out by the robot or robot arm 400, in which the robot or robot arm 400 queries specific preferences and the controller 901 determines or calculates the configuration of the mechanically movable event components 100 on the basis of this query so that, for example, persons who are initially unknown to one another but have similar interests or professional backgrounds are brought together at a given table configuration. However, it is also possible to carry out the ordering process at this juncture by interacting with the robot or robot arm.

At this point it should be mentioned that, even if not constantly mentioned explicitly, a sensory accompaniment of the experience and/or embedding of the event visit in a story or a theme can be continued by the respective devices for sensory stimulation 12, for example by projecting images, sound effects, vibrations and other haptic experiences, or generating smells.

After a given table configuration has been brought about, the appetizer can then be provided in the appetizer area 3. In principle, this can be done by event personnel or also by robot arms, but another very intriguing variant consists in making the food appear on the table from above or from below, effectively from the table, as is explained in detail using the example of FIGS. 5a and 5b.

Figure 5A:
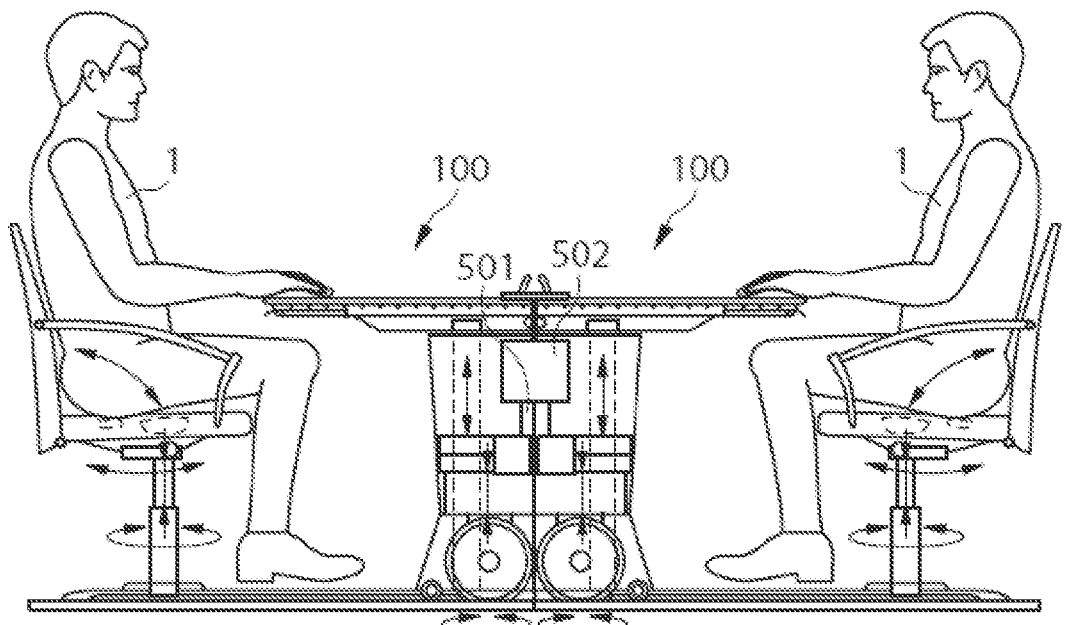
FIG. 5a: shows a cross section through one of the tables for 4 persons from FIG. 3 during a first phase of a possible supply of food.

FIG. 5a shows two examples of mechanically movable event furniture components 100, as described above in the context of FIG. 2, in an interconnected state and with a guest 1 arranged thereon. Furthermore, it is possible to see, in the interior, which is formed by the housings 127, a means for the automated provision of food 501, realized as a prop that can be driven out of an opening in the floor, and on which a buffet container 502 is arranged, in each case containing the selected appetizer of the guests 1.

Figure 5B:
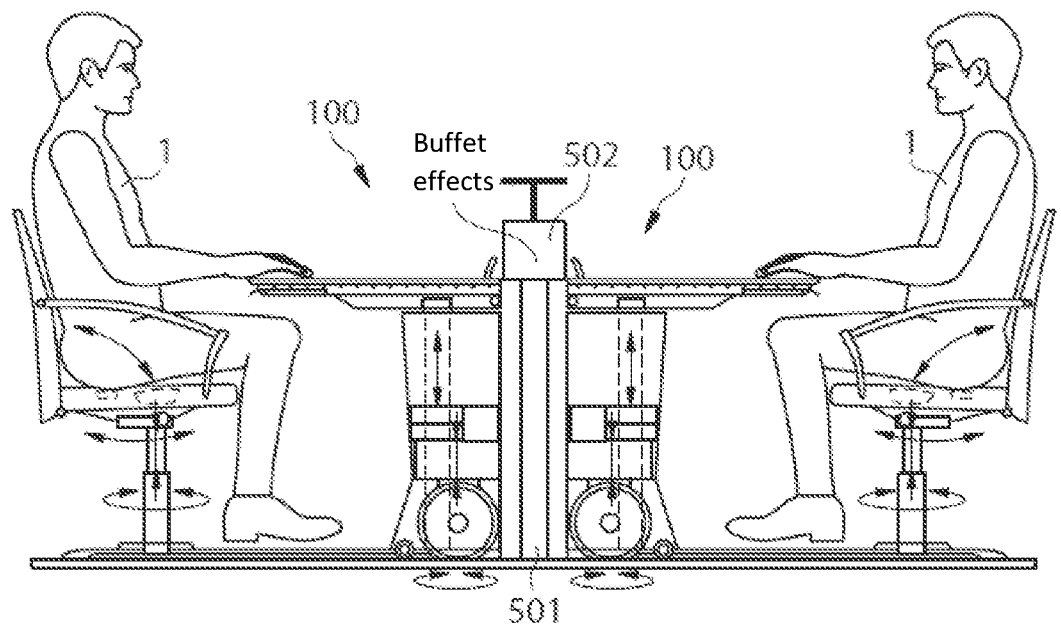
FIG. 5b: shows a cross section through one of the tables for 4 persons from FIG. 3 during a second phase of a possible supply of food.

In order to actually bring the appetizer onto the table 120, the mechanically movable event furniture components 100 slide apart by an imperceptible distance, as shown in FIG. 5b, such that the retractable prop with the buffet container 502 arranged thereupon can be extended to the level of the tabletops 121 and the food in the buffet container 502 can be accessed by the guests 1.

However, it is also possible to arrange the buffet container in the event furniture component right from the start and then to let said container appear on the tabletop using a lifting mechanism belonging to the event furniture component.

This procedure is particularly effective if the food is provided while the device for sensory stimulation 12 is distracting the guests' attention.

For example, a view along a part of the space station into space could be projected onto a wall of the appetizer area. Suddenly, a point begins to move in this image, whereupon the guests 1 are alerted by an audible message: "Intruder alert! Intruder alert!". In addition, the first controller 901 automatically turns the chairs 110 so that the guests can see the moving point when they look straight ahead. The point gets bigger and bigger and turns out to be an alien spaceship. Laser guns open fire on the spaceship, which fires back and continues to bear down on the space station. The spaceship gets hit and loses control. An audible warning "Impact! Impact" sounds, and the spaceship collides with the projected part of the space station, while at the same time a vibration is simulated by the vibration modules of the chairs and this moment is used to move the mechanically movable event furniture components 100 apart and provide the appetizer. After a large explosion accompanied by visuals, sounds, and vibrations, the chairs 110 are returned to their basic position on the instruction of the first controller 1901 to the chair controller 1902, and the guests are surprised to find their appetizer on the table.

It should be noted that, not least because of the fact that the entire visit to the animated event may take longer, the need to visit the toilet must also be taken into account, for which reason the sanitary area 7 is provided. Because of the mechanical movements of event furniture components, it is preferred if, when seeking out the sanitary area 7, the movement to said area also takes place while the guest 1 is arranged on an event furniture component. The guest 1 can initiate a visit to the toilet, for example by registering a corresponding need on a control tablet. The controller then calculates a suitable time and path and controls the mechanical movement of the corresponding event furniture component, it also being possible to take into account the current occupancy status of the sanitary area 7 so that waiting times in the line for the toilets can be minimized. However, going to the sanitary area 7 should preferably take place during the consumption phases in the areas 3, 4, 5 or 6 and not in the transition phases between the stays in these areas.

Once the appetizer has been consumed, the tables 11 or the event furniture components from which they are composed, reset themselves independently, i.e. controlled and choreographed by the controller 13, so that synchronization with the output of the device for sensory stimulation 12 takes place—for example in a form of locomotion that is adapted to the type of background musical accompaniment, e.g. in rotational movements with waltz sounds—in a movement to the next area, the first area for main courses 4.

In principle, this can be done after the dishes and cutlery used have been removed—by personnel, robots, or elevator equipment. Another entertaining possibility is that the event furniture components first enter a sector of the kitchen area 8 in order to return, in a quasi automated manner, the dishes and cutlery used. While the guest is moving with the event furniture part into this area, a film which augments the perceived reality can be projected in said area, for example by means of the device 12 for sensory stimulation. For example, the used plates could be placed on a real conveyor belt by a real gripper arm, which disappears into a projection screen, but which is continued in the projection into a kitchen run by aliens, where, for example, a food monster takes plates from the conveyor belt, pours leftovers into its mouth, and then hands the plate over to another alien type, which licks it with an oversized tongue, and then places it on a conveyor belt with "clean" plates.

The event furniture component 100 then travels past such a conveyor belt with clean plates, which belt emerges from the projection screen, and the guest 1 is prompted acoustically and/or visually to take one of these plates—which, for example, could also still have a slightly moist or slightly slimy surface, an unusual temperature, and/or a strange smell, in order to create points of reference for the "cleaning" of the plates by the aliens in the film—from the conveyor belt when the first area for main courses 4 is operated as a buffet area. This illusion is particularly strong if the guests receive individually distinguishable plates and the plate taken from the conveyor belt looks exactly like the one that was handed in.

The event furniture component then travels to a buffet element and docks therewith. Possible example configurations of the event furniture components for a first area for main courses 4 operated in a buffet mode are shown in FIGS. 6 and 7.

Figure 6:
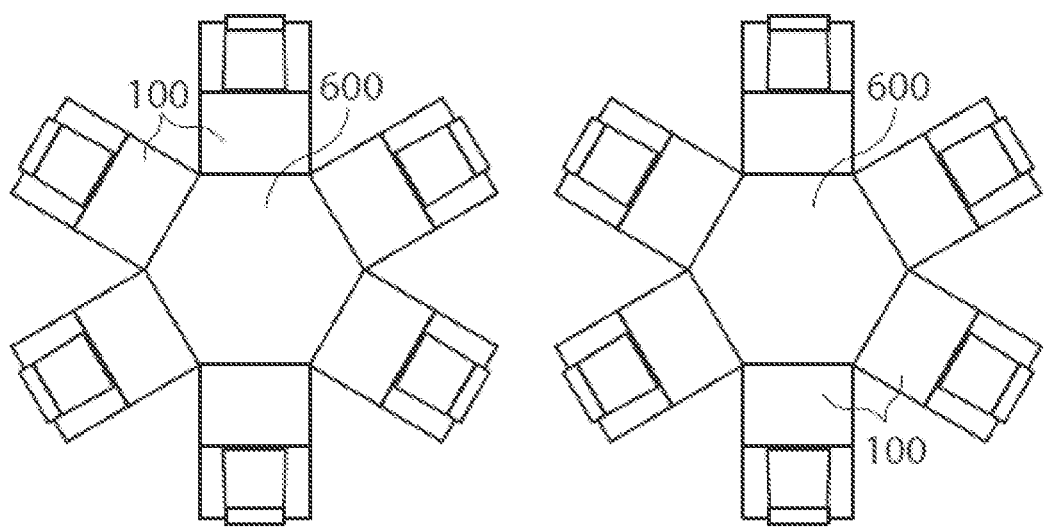
FIG. 6: shows a schematic example of a first table formation in which the event furniture components that can be moved in space from FIG. 2 are docked to a buffet module.

In the configuration shown in FIG. 6, two event furniture components can be seen in the form of hexagonal buffet tables 600, on each side of which a mechanically movable event furniture component 100 is docked. For this purpose, but not necessarily, the event furniture components 600, which are configured as buffet tables, themselves each have movement means for carrying out a machine-controlled movement, which makes it possible, while the guests 1 are in a different area, to drive the event components 600 configured as buffet tables in a machine-controlled manner into a section of the kitchen area 8 and refill said them there for the next guests.

Figure 7:
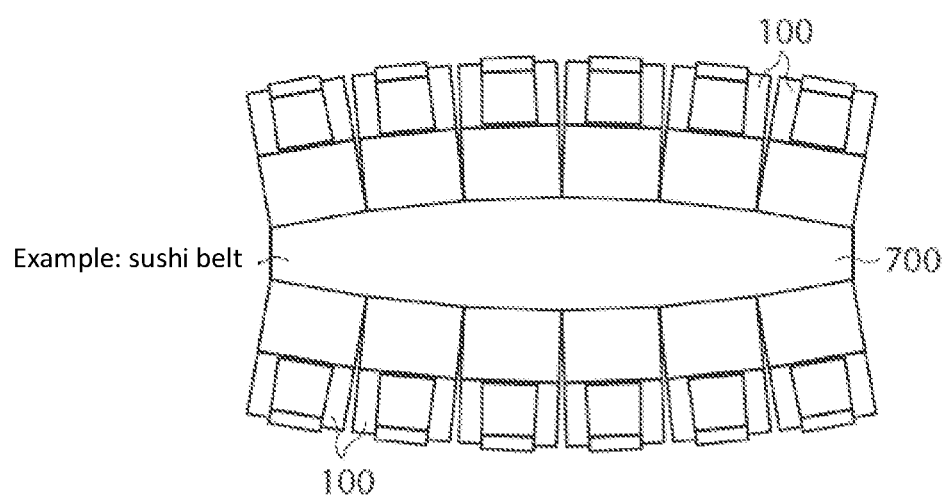
FIG. 7: shows a schematic example of a second table formation in which the event furniture components that can be moved in space from FIG. 2 are docked to a buffet module.

In the configuration shown in FIG. 7, an event furniture component 700 configured as a sushi belt can be seen, on each side of which six mechanically movable event furniture components 100 are docked. In this example, but not necessarily, the event furniture component 700, which is configured as a sushi belt, has movement means itself for carrying out a machine-controlled movement, which makes it possible, while the guests are in a different area, to drive the buffet tables in a machine-controlled manner into a section of the kitchen area 8 and refill them there for the next guests.

For the sake of completeness, it should be pointed out that it is of course also possible to move an event furniture component 600, 700 together with the event furniture components 100 docked therewith.

This process can also be enhanced by action elements, for example if, embedded in the output of the device for sensory stimulation 12, the buffet elements themselves have means for carrying out a mechanical movement, move in space, and have to be "captured" by the event furniture components 100 with chair 110 and table element 120, which then gradually dock. Alternatively, tables can first be formed from the event furniture components, which then move apart when buffet tables or sushi belts arrive and take them into their center.

After the first main course has been consumed at the buffet in the first area for main courses 4, the sequence proceeds to the second area for main courses 5. The mechanical movement of the event furniture components to that point can be synchronously accompanied or controlled, for example, as will now be explained in more detail with reference to FIG. 8, by an event furniture component in the form of a robot or robot arm 800, which is preferably guided on a rail system mounted on the ceiling.

Figure 8:
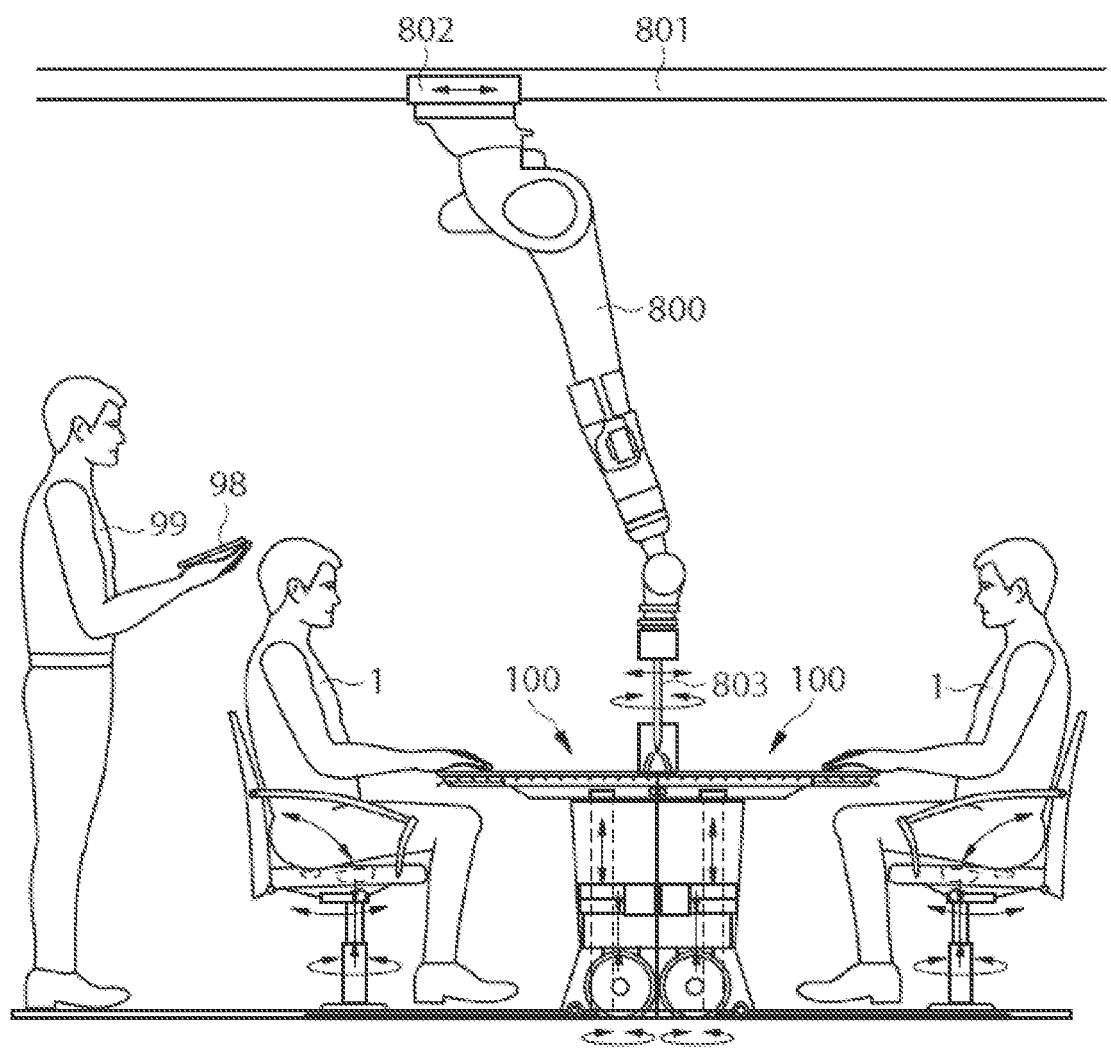
FIG. 8: shows an example of the use of a robot arm in the movement of event furniture components that can be moved in space or a table formation composed of said components.

FIG. 8 shows two examples of mechanically movable event furniture components 100, as described above in the context of FIG. 2, in an interconnected state and with a guest 1 arranged thereon. Furthermore, another event furniture component can be seen in the form of a robot or robot arm 800 suspended from a guide rail 801 with the aid of its automated drive unit as a movement means 802 for executing a mechanical movement. The robot or robot arm 800 arrives in response to a command from the first controller 1901 to the robot controller 1907 and brings a probe 803 close to the tables 120 of the connected, mechanically movable event furniture components 100.

The first controller 1901 then controls the robot or robot arm 800 simultaneously and synchronously via the robot controller and the mechanically movable event furniture components 100 via the navigation controller 1910 in such a way that the guests get the impression that their movement is caused by the robot or robot arm 800, which, of course, they cannot explain since no interaction or coupling can be identified (and actually does not exist).

Also shown is an event employee 99 with an operator unit 98 which allows the first controller 1901 to be influenced via the operator controller 1912 in order to be able to intervene immediately in dangerous situations that can be identified or foreseen by humans.

Figure 9:
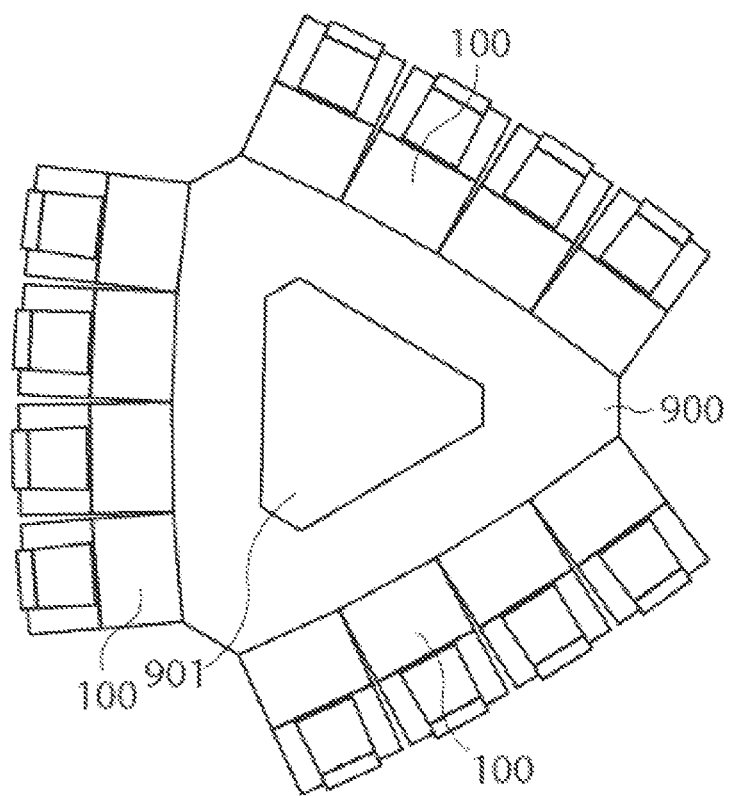
FIG. 9: shows a schematic example of a table formation in which the event furniture components that can be moved in space from FIG. 2 are docked to a show cooking module.

The movement apparently induced by the robot or robot arm 800 can in particular also pass again via the kitchen area 8, where, for example, depending on the order placed, it docks with one of multiple show cooking stations, as is shown by way of example in FIG. 9.

FIG. 9 shows an event furniture component 900 in the form of a show cooking station 900, at the center 901 of which the chef is located and four mechanically movable event furniture components 100 are docked with each side of the station. The guests 1 seated at said station can then follow the preparation of their dishes directly, or at least the final phase, the plates then arriving to the tables 120 completely fresh. After receiving the prepared meal, the event furniture components 100 continue to travel in a machine-controlled manner to the second area for main courses 5, where they then configure themselves again with other event furniture components to form a table 11 for a specific number of persons.

Figure 10:
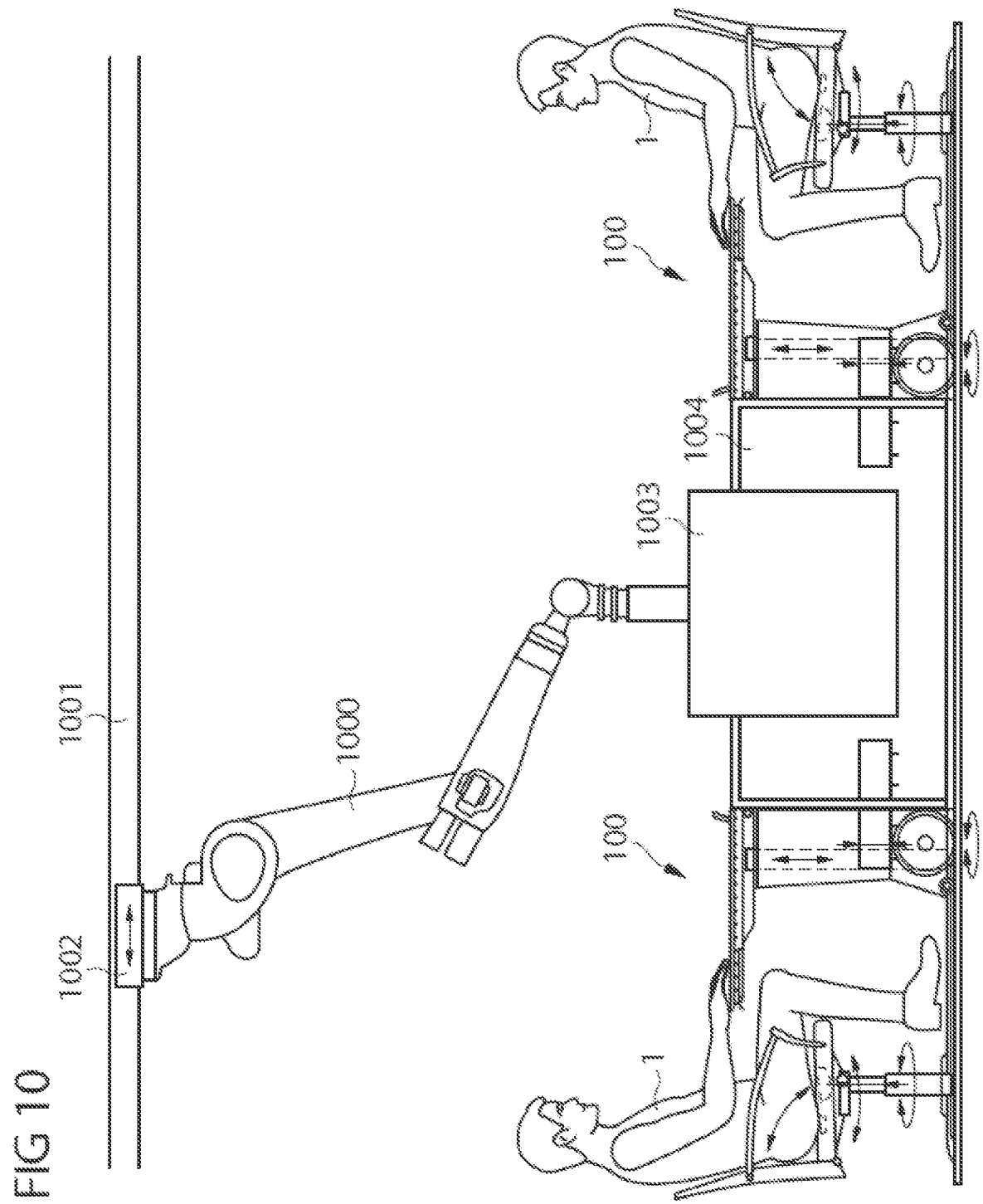
FIG. 10: shows an example of the use of a robot arm in the supply of food to a table formation.

After this course has been consumed, the event furniture components then move to the dessert area 6, where they reassemble to form a large table 11 for 12 persons. The dessert can be served as a buffet 1003 in a mechanically movable event furniture component 1004 in the form of a buffet module or served individually by a mechanically movable event furniture component in the form of a robot or robot arm 1000, as shown in FIG. 10, which is mounted in a movable manner on a guide rail 1001 belonging to a rail system together by a movement means 1002 in the form of an automated drive unit. During or after completion of the consumption of the dessert, the device 12 for sensory stimulation can project the return to Earth onto the walls of the dessert area 6. After that, the space travel experience is over, and the guests are released back to lobby area 9, where they can of course have a drink while they process their adventure and the many unique sensations they have experienced.

Figure 12A:
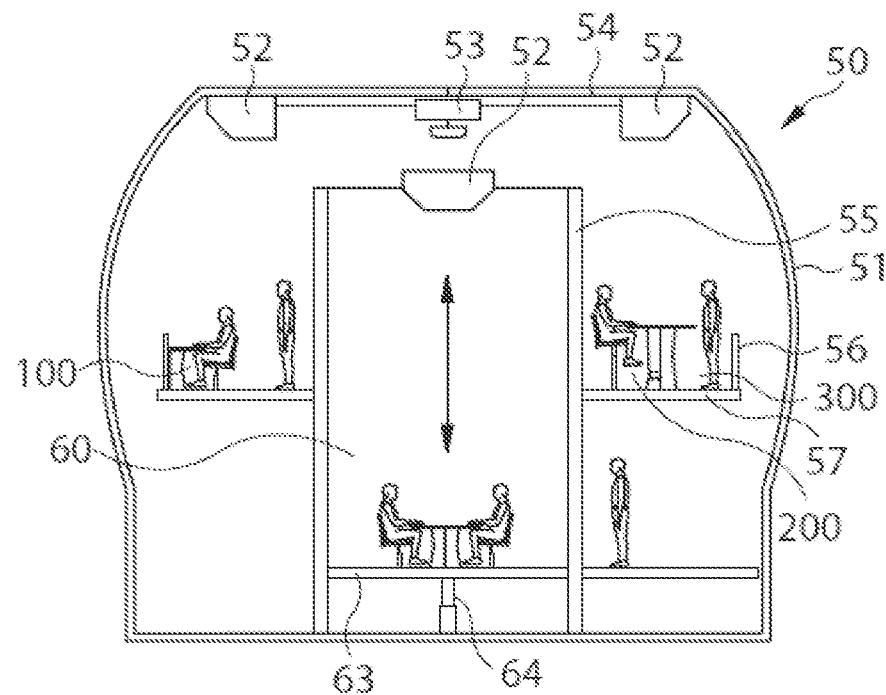
FIG. 12a: shows a side view of a second example of an event system.
Figure 12B:
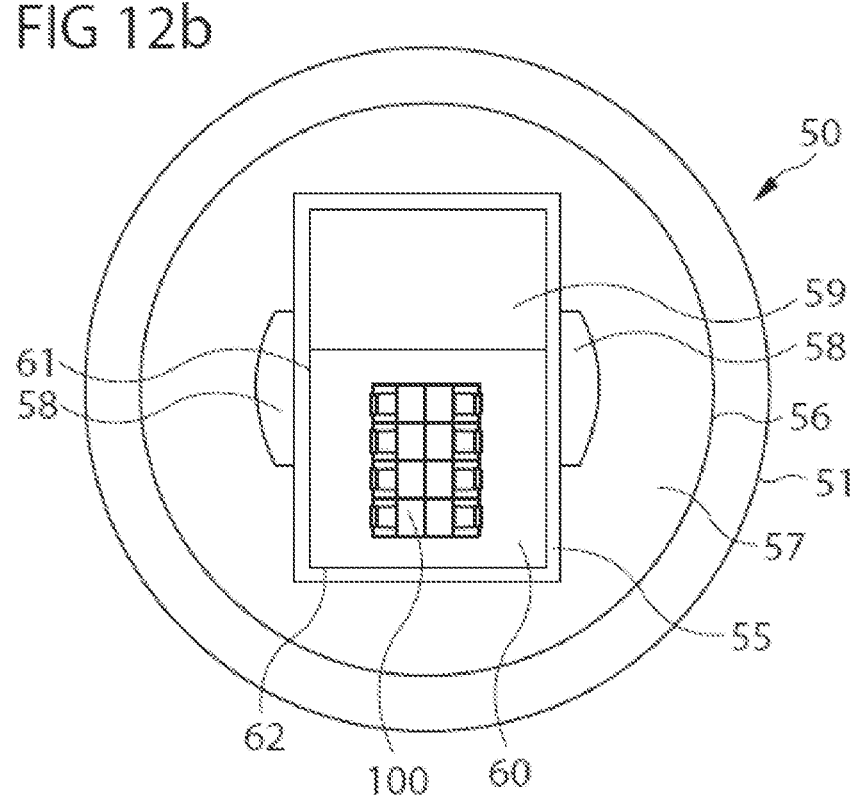
FIG. 12b: shows a plan of the second example of an event system, viewed from above.

An alternative concept for an animated event with an event system 50 is shown in FIGS. 12a and 12b. With this concept, virtual visits to vantage points in particular can be easily simulated so that unique sensations can be conveyed in addition to the taste experience of the event visit.

As in the event system 10, the event system 50 is also characterized, firstly, by mechanically movable event furniture components 100, 200, 250, 300, and/or 350 likewise realized as described above, for example, in connection with FIGS. 2, 13, and 14.

Secondly, devices 52 for sensory stimulation of guests of the animated event are also present here. In particular, this is realized here as a visual stimulation by means of projectors and supporting these visual effects with sound effects; here too, however, olfactory effects can also be achieved by releasing aromatic substances or haptic effects, e.g., vibrations, spray mist, air currents, or the like.

Figure 11:
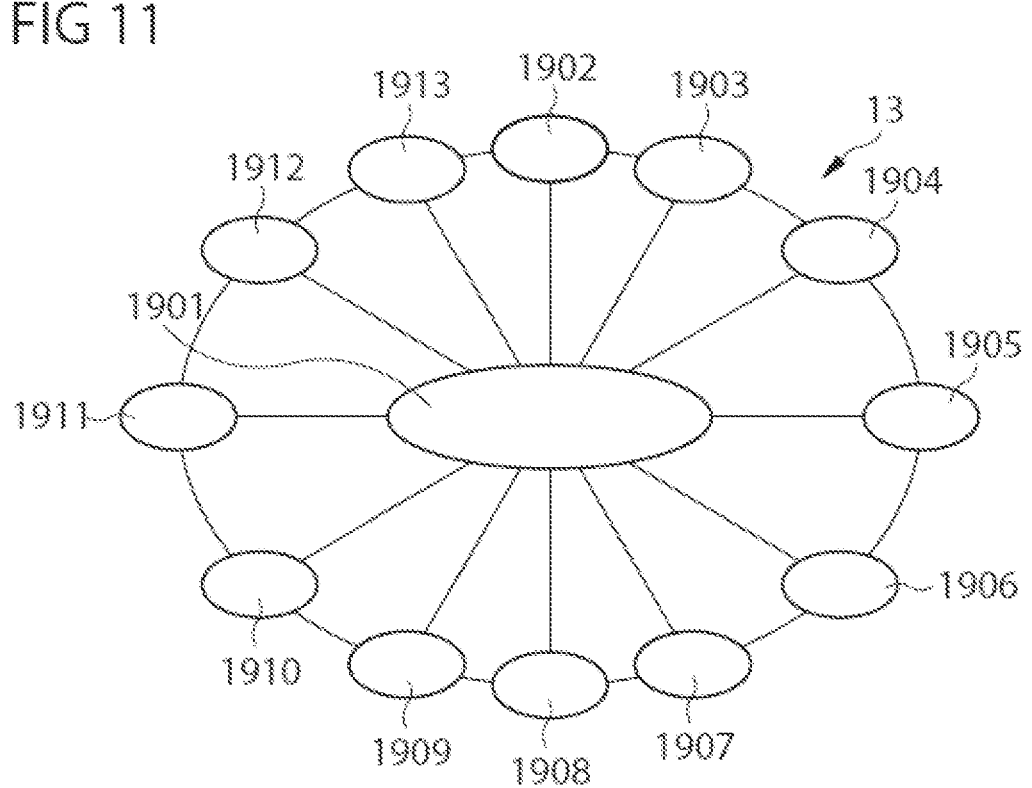
FIG. 11: shows a setup schema for a controller.

Thirdly, in this case too, the movement of the event furniture components 100, 200, 250, 300, and/or 350 and the sensory stimulation of the guests 1 arranged thereon is synchronized by means of a controller 53, which is shown only schematically as in FIG. 1, but can be constructed in the same way as the controller 13 explained in more detail above with reference to FIG. 11.

As the overview of FIGS. 12a and 12b shows, a core element of the event system 50 of this animated event is a dome 51, which serves as a projection surface and within which the entire event operation takes place. 3D-cinema-like movies and/or image sequences can be projected onto the inside of the dome 51, in particular by means of a device 52 for sensory stimulation mounted on the support system 54 fastened to the ceiling of the dome 51, which device comprises movable projectors. In particular, it is advantageous if the degrees of freedom of movement are raised, lowered, rotated, tilted, and a change in the distance from the fastening point of the support system is realized in the radial direction, and particularly preferably by means of a drive system which is likewise controlled by the controller 53.

Arranged in the center of the dome 51 is a central structure 55 surrounded by a circumferential viewing platform 57 which is secured by a railing 56 and can be accessed by doors from the central structure 55 that are large enough for restaurant furniture components 100, 200, 250, 300, 350 to pass through individually and/or in groups as a result of a mechanical movement. The food and drinks are consumed on this viewing platform 57, and the event furniture components 100, 200, 250, 300, 350 are moved by the controller 53 in synchronization with the sensory stimulation, in particular by the output of the device 52 for sensory stimulation mounted on the support system 54 fastened to the ceiling of the dome 51, which device comprises movable projectors. Bar counters 58 can be present on the viewing platform 57 for the provision of food and drinks.

As an output of the device 52 for sensory stimulation, panoramas adapted to the viewing platform 57 are suitable, for example, so that one can enjoy the view of Paris, for example, as if in an observation restaurant on the Eiffel Tower or a view from the summit of Mount Everest.

An infrastructure area 59 is provided in the interior of the central structure 55, which in particular can accommodate stairs, sanitary facilities, a technical room in which in particular the controller 53 is housed, storage rooms, and/or the kitchen. In addition, the interior of the central structure 55 also has a room 60 containing a further device 52 for sensory stimulation.

With this additional room 60 containing a further device 52 for sensory stimulation, an additional action element can be realized, which makes the visit to the animated event operated by an event system 50 a unique experience and, in particular, fits well with the vantage point theme, specifically a simulation of the ascent to said vantage point—for example an elevator ride to the top of a skyscraper, a futuristic elevator ride to the moon, or a flight to the top of a mountain on the back or in the claws of a giant bird or a dragon.

As with the operation of the animated event by the event system 10, the guests first take a seat at a table that is provided in the room 60 and composed of a plurality of event furniture components 100, 200, 250, 300, 350 or are mechanically moved into the room 60 on the event furniture components 100, 200, 250, 300, 350 and grouped to the table. By means of a projection of the further device 52 for sensory stimulation onto the interior walls of the room 60, the ascent to the vantage point can then be simulated, for example, in the case of a city panorama on the viewing platform 57, a journey upward in a glass elevator on the facade of a skyscraper can be simulated. On one part 61 of the interior walls of the room, for example, a view of individual floors of the skyscraper and what is happening therein can be projected, while, on another part 62 of the interior walls, starting from what is happening in the street, which becomes smaller and smaller in the course of the ascent, more and more of the city skyline becomes visible.

While it is possible in principle to generate these impressions by means of visual stimulation alone, i.e., there is in fact no need to change the floor at all, the impressions can be considerably intensified if they are supplemented by further sensory perceptions.

For example, a floor section 63 of the room 60 can be arranged on a movement apparatus 64, here for example a hydraulic device, which can actually carry out a lifting movement and thereby realize acceleration effects, such as those that occur in an elevator. However, in the case of a complex movement apparatus 64, such as is used, for example, in flight simulators for pilot training, swivel, roll, and tilt movements can also be realized. This can then be used to integrate further action or narrative moments into the ascent. For example, King Kong can appear on a skyscraper, on the outer facade of which the elevator is traveling, and can jolt the elevator, causing it to sway. In particular, if the view simulated on the viewing platform by sensory stimulation is that of a mountain peak, it is also possible to simulate the flight movements of a giant bird or dragon carrying the guests in the sensory stimulation up the mountain, which further intensifies the overall impression.

In addition, a number of other sensory stimulations can of course also be carried out. For example, smells can be adapted to events on floors of the skyscraper that are being passed by the elevator. For example, when passing a bakery, the scent of cakes, or when passing a laundry shop, the scent of detergent and fresh laundry, or perfume scents when passing through a perfumery, or moisture can be released when passing through cloud cover.

At the end of the ascent accompanied by such sensory effects, doors to the viewing platform 57 open and the individual event furniture components 100, 200, 250, 300, 350 move onto the viewing platform in synchronization with this part of the output of the device 52 for sensory stimulation.

Food and drinks can then be enjoyed there, in particular with a view of the images projected into the dome 51 by the device 52 for sensory stimulation, before the journey in the opposite direction back to the floor is simulated at the end of the stay in the room 60.

Instead of an individual floor section 63, as shown in FIG. 12a, the entire floor of the room 60 can then also be moved by the movement apparatus 64 and a lifting movement can actually be carried out on one side in order to realize acceleration effects but also vibrations. In this way, the visit to the animated event operated by an event system 50 can be a unique experience, in which, in addition to the previously described scenarios, for example an elevator ride or the like, extraordinary additional effects such as earthquakes and malfunctions can be produced. Air holes or malfunctions can also be impressively simulated during a flight on the back or in the claws of a giant bird, a dragon, a carpet, or an aircraft. A community experience can be strengthened in particular by the fact that all guests in the room are arranged together on a single floor section and can experience the event at the same time as shown in FIG. 12c.

Figure 12C:
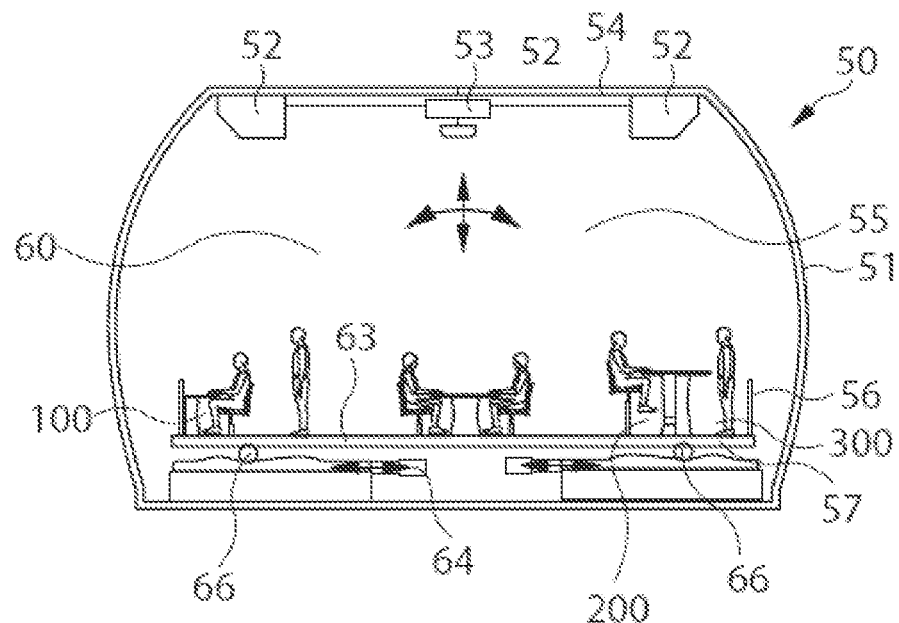
Figure 12D:
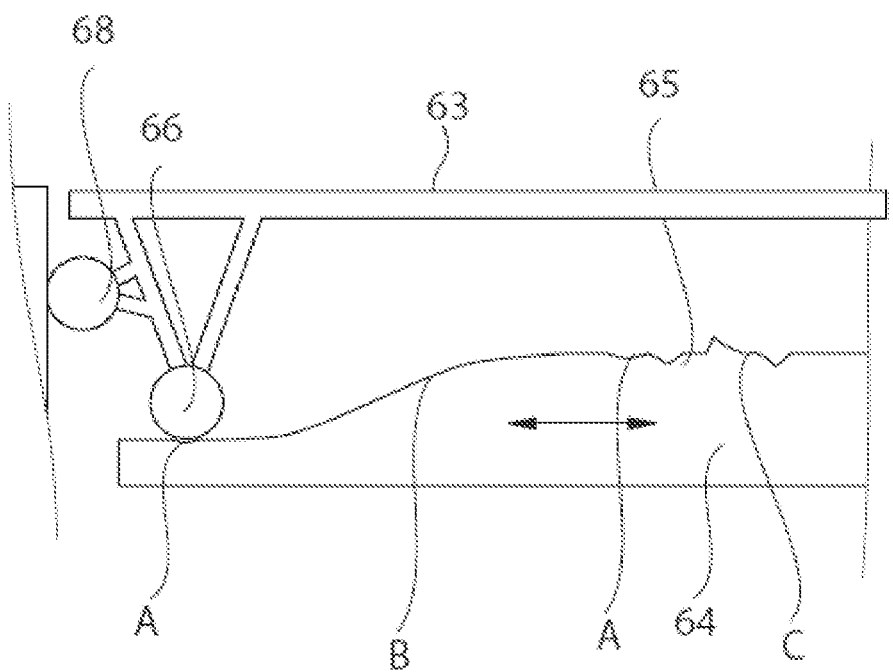
FIG. 12d: shows a detailed representation of the event system according to FIG. 12c.

A schematic detailed representation according to FIG. 12d shows the movement apparatus 64 according to FIG. 12c, where the movement apparatus 64 has a motion link 65 which can be displaced in the direction marked with a double arrow. The motion link 65 is in effective contact with a support 66 of the floor section 63 and can preferably be displaced horizontally by means of an actuator. The motion link 65 can have contour that is adapted to the use. In the example according to FIG. 12d, a plurality of local minima A are present, in which the motion link 64 can hold the floor section in a position without force. Furthermore, the motion link has a ramp section B and a corrugated section C. The ramp section B is intended to exert a lifting movement on the support 66 or the floor section 63 and the corrugated section C is intended to produce vibrations.

The floor section 63 can be mounted in a laterally movable manner and in FIG. 12b a bearing 68 is symbolically formed by means of a roller. The floor section 63 can preferably be moved by three movement apparatuses 64, each of which comprises a motion link 65 and a linear drive system. The movement apparatuses can be operated synchronously or asynchronously, as a result of which a movement apparatus 64 designed in this way enables a movement of the floor section 63 in three degrees of freedom, namely a lifting movement and movements in two solid angles.

LIST OF REFERENCE NUMERALS

1 Guest
2 Experience area
3 Appetizer area
4, 5 Area for main courses
6 Dessert area
7 Sanitary area
8 Kitchen area
9 Bar area
10 Event system
11 Table 12 Device for sensory stimulation
13 Controller
15 Wall, partition, or privacy element
16 Docking station
50 Event system
51 Dome
52 Device for sensory stimulation
53 Controller
54 Support system
55 Central structure
56 Railing
57 Viewing platform
58 Bar counter
59 Infrastructure area
60 Room
61 Part of the interior walls
62 Part of the interior walls
63 Floor section
64 Movement apparatus
65 Motion link
66 Support
68 Bearing
98 Operator unit
99 Event employee
100 Event furniture component
110 Chair
111 Supporting frame
112 Seat
120 Table
121 Tabletop
122 Quick coupling
123 Stand
127 Housing
130 Base plate
131 Support means
132 Friction wheel
133 Height adjustment mechanism
134 Operating materials storage unit
135 Control means
136 Communication module
200 Event furniture component
201 Coupling device
250 Event furniture component
300 Event furniture component
350 Event furniture component
400 Robot or robot arm
401 Guide rail
402 Movement means
501 Means for the automated provision of food
502 Buffet container
600 Event furniture component
700 Event furniture component
800 Robot or robot arm
801 Guide rail
802 Movement means
803 Probe
900 Event furniture component
901 Center
1000 Robot or robot arm
1001 Guide rail
1002 Movement means
1003 Buffet module
1111 Quick coupling
1112 Sliding mechanism
1113 Lifting mechanism
1114 Rotation mechanism
1115 Tilting mechanism
1121 Armrest
1122 Backrest
1123 Apparatus for sensory stimulation
1124 Sensor
1125 Operating element
1211 Transmitter and/or receiver
1212 Distance sensor
1213 Safety sensor
1214 Means for generating special effects
1215, 1216 Display
1217 Operating element
1901 First controller
1902 Chair controller
1903 Table controller
1904 Light controller
1905 Fan controller
1906 Buffet controller
1907 Robot controller
1908 Sound controller
1909 Projection controller
1910 Navigation controller
1911 Calibration controller
1912 Operator controller
1913 Docking station controller

The invention claimed is:

1. An event system (10, 50) for an animated event in an event space characterized by mechanical or projected movement of objects to create animation of the animated event, wherein the event system (10, 50) comprises;
at least one event furniture component (100, 200, 250, 300, 350) which can be moved in the event space and which comprises at least one table and/or at least one chair,
at least one device for sensory stimulation (12, 52) of guests (1) of the animated event,
characterized in that:
the event furniture component (100, 200, 250, 300, 350) which can be moved in the event space comprises movement means for mechanical movement,
the event system (10, 50) also comprises a first controller (1901) which is designed to control the mechanical movement and the output of the device (12, 52) for sensory stimulation of guests (1) of the animated event in a synchronized manner, and
the event system (10, 50) also comprises at least one movable wall, partition, or privacy element (15) as a further event furniture component.

2. The event system (10, 50) according to claim 1, further comprising at least one floor section (63) that can be moved in the event space, wherein the at least one floor section (63) can be moved mechanically by at least one movement apparatus (64), and wherein the event system (10, 50) also comprises a first controller (1901) which is designed to control the mechanical movement of the at least one floor section (63) and an output of a device (12, 52) for sensory stimulation of guests (1) of the animated event in a synchronized manner.

3. The event system (10, 50) according to claim 2, characterized in that the movement apparatus (64) can move the at least one floor section (63) in at least three degrees of freedom.

4. The event system (10, 50) according to claim 2, characterized in that the movement apparatus (63) comprises at least one linear drive system and/or a weight compensation system.

5. The event system (10, 50) according to 2, characterized in that the movement apparatus (64) comprises a motion link, by means of which a deflection at a point of application of the at least one floor section (63) is predetermined.

6. The event system (10, 50) according to claim 1, characterized in that the device for sensory stimulation (12, 52) is configured and/or designed for visual, acoustic, olfactory, and/or haptic stimulation.

7. The event system (10, 50) according to claim 1, characterized in that the environment and/or the output of the device (12, 52) for sensory stimulation is variable.

8. The event system (10, 50) according to claim 1, characterized in that the movable wall, partition, or privacy element (15) can be moved mechanically and in that this mechanical movement is either also controlled by the first controller (1901) and/or is controlled by a further controller.

9. The event system (10, 50) according to claim 1, characterized in that the event system (10, 50) also has means (501) for the automated provision of food on the table (11, 120), which means are controlled by the first controller (1901) and/or by a further controller.

10. The event system (10, 50) according to claim 1, characterized in that the event system (10, 50) has at least one robot or robot arm (400, 800, 1000) which is controlled by the first controller (1901) and/or by a further controller (1907).

11. The event system (10, 50) according to claim 1, characterized in that the mechanical movement is effected by an air cushion system, by a magnetic system, by an in-floor conveyor system, by a rail system, by a combination of said systems, or by a combination of said systems in sections.

12. The event system (10, 50) according to claim 1, characterized in that:
the controller (13) is programmed and designed in such a way that the device (12, 52) for sensory stimulation of guests (1) of the animated event
provides visual content either projected onto tables (120), chairs (110), floor sections (63), wall sections, or in the space between the components of the event system (10, 50), or provides said content to the guest (1) in a personalized viewing device, and/or
acoustically accompanies mechanical movements and/or projected visual content, and/or
releases aromatic substances adapted to visual content or acoustic accompaniment, and/or
generates haptic stimuli, locally at tables (120) or chairs (110).

13. The event system (10, 50) according to claim 1, characterized in that the event system (10, 50) has one or more sensors (1124, 1213) for detecting the behavior of guests (1) of the animated event, which sensors are in signal communication with at least one of the controllers.

14. The event system (10, 50) according to claim 1, characterized in that the event system (10, 50) has a navigation controller (1910), by means of which the position of individual event furniture components (100, 200, 250, 300, 350) of the event system (10, 50) can be detected and the movement of individual event furniture components (100, 200, 250, 300, 350) of the event system (10, 50) can be controlled.

15. The event system (10, 50) according to claim 1, characterized in that operator units (98) which are in direct or indirect signal communication with the first controller (1901) and allow intervention in the procedures of the first controller (1901) are available to event employees (99).

16. A method for operating an event system (10, 50) according to claim 1, characterized in that a mechanical movement of at least one restaurant furniture part (100, 200, 250, 300, 350) and/or of at least one floor section (63) and the output of the device (12, 52) for sensory stimulation of guests (1) of the animated event are automatically synchronized with one another by the first controller (1901).

17. The method according to claim 16, characterized in that:
the device (12, 52) for sensory stimulation of guests (1) of the animated event,
provides visual content either projected onto tables (11, 120), chairs (110), floor sections, wall sections, or in the space between the components of the event system, or provides said content to the guest (1) in a personalized viewing device, and/or
acoustically accompanies mechanical movements and/or projected visual content, and/or
releases aromatic substances that are preferably adapted to visual content or acoustic accompaniment, and/or
generates haptic stimuli, preferably locally at tables (11, 120) or chairs (110).

18. An event system (10, 50) for an animated event in an event space, characterized by mechanical or projected movement of objects to create animation of the animated event, wherein the event system (10, 50) comprises:
at least one event furniture component (100, 200, 250, 300, 350) which can be moved in the event space and which comprises at least one table and/or at least one chair,
at least one device for sensory stimulation (12, 52) of guests (1) of the animated event,
characterized in that:
the event furniture component (100, 200, 250, 300, 350) which can be moved in the event space comprises movement means for mechanical movement,
in that the event system (10, 50) also comprises a first controller (1901) which is designed to control the mechanical movement and the output of the device (12, 52) for sensory stimulation of guests (1) of the animated event in a synchronized manner, and
the event system (10, 50) also has means (501) for the automated provision of food on the table (11, 120), which means are controlled by the first controller (1901) and/or by a further controller.

19. An event system (10, 50) for an animated event in an event space, characterized by mechanical or projected movement of objects to create animation of the animated event, wherein the event system (10, 50) comprises:
at least one event furniture component (100, 200, 250, 300, 350) which can be moved in the event space and which comprises at least one table and/or at least one chair,
at least one device for sensory stimulation (12, 52) of guests (1) of the animated event,
characterized in that:
the event furniture component (100, 200, 250, 300, 350) which can be moved in the event space comprises movement means for mechanical movement,
in that the event system (10, 50) also comprises a first controller (1901) which is designed to control the mechanical movement and the output of the device (12, 52) for sensory stimulation of guests (1) of the animated event in a synchronized manner, and
the event system (10, 50) has at least one robot or robot arm (400, 800, 1000) which is controlled by the first controller (1901) and/or by a further controller (1907).

20. The event system (10, 50) according to claim 19, characterized in that the robot or robot arm (400, 800, 1000)

is suspended from the ceiling and/or mounted on a guide rail (401, 801, 1001) that is mounted on the ceiling.

21. The event system (10, 50) according to claim 19, characterized in that the first controller (1901) controls the mechanical movement of the event furniture component (100) by interacting with the robot or robot arm (800) controlled directly or indirectly by the first controller (1901).

22. The event system (10, 50) according to claim 19, characterized in that the first controller (1901) and/or the further controller is programmed and designed in such a way that the means for the automated provision of food on the table (11, 120) interact with the robot or robot arm during the automated provision of food.

23. The event system (10, 50) according to claim 19, characterized in that the first controller (1901) and/or the further controller is programmed and designed in such a way that the robot or robot arm (400) interacts with guests (1) of the animated event.

\* \* \* \* \*